US012198638B2

(12) United States Patent
Her et al.

(10) Patent No.: US 12,198,638 B2
(45) Date of Patent: Jan. 14, 2025

(54) ELECTRONIC DEVICE FOR DRIVING PLURALITY OF DISPLAY AREAS OF DISPLAY AT DIFFERENT DRIVING FREQUENCIES

(71) Applicant: Samsung Electronics Co., Ltd., Suwon-si (KR)

(72) Inventors: Yongkoo Her, Suwon-si (KR); Youngdo Kim, Suwon-si (KR); Hyunchang Shin, Suwon-si (KR); Woonbo Yeo, Suwon-si (KR); Minwoo Lee, Suwon-si (KR); Songhee Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/341,235

(22) Filed: Jun. 26, 2023

(65) Prior Publication Data

US 2023/0335064 A1 Oct. 19, 2023

Related U.S. Application Data

(63) Continuation of application No. PCT/KR2022/001076, filed on Jan. 20, 2022.

(51) Int. Cl.
*G09G 3/3275* (2016.01)
*G09G 3/3266* (2016.01)

(52) U.S. Cl.
CPC ......... *G09G 3/3275* (2013.01); *G09G 3/3266* (2013.01)

(58) Field of Classification Search
None
See application file for complete search history.

(56) References Cited

U.S. PATENT DOCUMENTS 7,092,023 B2 8/2006 Hayashi
8,766,907 B2 7/2014 Nishimoto
(Continued)

FOREIGN PATENT DOCUMENTS

JP H11-018024 A 1/1999
JP 2007-271908 A 10/2007
(Continued)

OTHER PUBLICATIONS

International Search Report with Written Opinion dated Apr. 27, 2022; International Patent Application No. PCT/KR2022/001076.
Korean Office Action with English translation dated Sep. 24, 2024; Korean Appln. No. 10-2021-0008786.

*Primary Examiner* — Nitin Patel
*Assistant Examiner* — Amen W Bogale
(74) *Attorney, Agent, or Firm* — Jefferson IP Law, LLP

(57) ABSTRACT

An electronic device and a method for driving a plurality of display areas of a display at different driving frequencies are provided. The electronic device can determine a first driving frequency of a first application, and the position of a first portion on which a first execution screen of the first application is to be displayed, determine a second driving frequency of a second application, and the position of a second portion on which a second execution screen of the second application is to be displayed, determine a third driving frequency of a third application, and the position of a third portion on which a third execution screen of the third application is to be displayed, and drive a first area of the display panel based on a first partial scan rate, and drive a second area of the display panel based on a second partial scan rate.

18 Claims, 23 Drawing Sheets

(56) References Cited

U.S. PATENT DOCUMENTS

| | | | | |
|---|---|---|---|---|
| 8,879,004 | B2 | 11/2014 | Oami et al. | |
| 9,613,554 | B2 | 4/2017 | Jang et al. | |
| 2003/0193464 | A1 | 10/2003 | Yamano et al. | |
| 2014/0085276 | A1* | 3/2014 | Jang | G09G 3/2007 345/204 |
| 2014/0104243 | A1 | 4/2014 | Sakariya et al. | |
| 2016/0042707 | A1 | 2/2016 | Wang et al. | |
| 2016/0042708 | A1* | 2/2016 | Wang | G09G 3/3611 345/214 |
| 2016/0133224 | A1* | 5/2016 | Nakajima | G06F 3/1446 348/445 |
| 2016/0170607 | A1 | 6/2016 | Shin et al. | |
| 2016/0329033 | A1 | 11/2016 | Woo et al. | |
| 2020/0133482 | A1 | 4/2020 | Kim et al. | |
| 2022/0139295 | A1* | 5/2022 | Cui | G09G 5/003 345/204 |
| 2023/0224425 | A1* | 7/2023 | Lee | H04N 5/04 348/495 |

FOREIGN PATENT DOCUMENTS

| | | | | |
|---|---|---|---|---|
| JP | 2007-322747 | A | | 12/2007 |
| JP | 2013128266 | A | * | 6/2013 |
| KR | 10-2014-0039524 | A | | 4/2014 |
| KR | 10-2016-0070446 | A | | 6/2016 |
| KR | 10-2016-0071897 | A | | 6/2016 |
| KR | 10-2016-0130628 | A | | 11/2016 |
| KR | 10-2020-0047162 | A | | 5/2020 |
| WO | 2016/022265 | A1 | | 2/2016 |
| WO | 2018/215867 | A1 | | 11/2018 |

* cited by examiner

∴ 30 Hz < Ref. Hz

ELECTRONIC DEVICE FOR DRIVING PLURALITY OF DISPLAY AREAS OF DISPLAY AT DIFFERENT DRIVING FREQUENCIES

CROSS-REFERENCE TO RELATED APPLICATION(S)

This application is a continuation application, claiming priority under § 365(c), of an International application No. PCT/KR2022/001076, filed on Jan. 20, 2022, which is based on and claims the benefit of a Korean patent application number 10-2021-0008786, filed on Jan. 21, 2021, in the Korean Intellectual Property Office, the disclosure of which is incorporated by reference herein in its entirety.

BACKGROUND

1. Field

The disclosure relates to an electronic device and method for driving a plurality of display areas of a display at different driving frequencies.

2. Description of Related Art

Displays of electronic devices are key technology in the information and communication era and are developing in the direction of thinner, lighter, portable and high-performance. For example, organic light-emitting diode (OLED) displays are attracting attention as flat panel display devices that can reduce the weight and volume, which are the disadvantages of cathode ray tubes (CRT). The OLED display may display an image by arranging a plurality of pixels in a matrix form. Each of the pixels may include a light emitting element, at least one thin film transistor (TFT) for independently driving the light emitting elements, and a storage capacitor.

The above information is presented as background information only to assist with an understanding of the disclosure. No determination has been made, and no assertion is made, as to whether any of the above might be applicable as prior art with regard to the disclosure.

SUMMARY

Recently, consumer demand for increasing a refresh rate of a display is increasing. As the refresh rate of the display increases, the sharpness of an image displayed from the display increases, and more natural video may be expressed.

Aspects of the disclosure are to address at least the above-mentioned problems and/or disadvantages and to provide at least the advantages described below. Accordingly, an aspect of the disclosure is to provide an electronic device for a split display function of dividing the entire display area into a plurality of display areas and displaying different screens through the divided display areas.

Another aspect of the disclosure is to provide an electronic device and method capable of reducing waste of power consumption due to unnecessary high refresh rate driving while providing an optimal screen to a user by driving a plurality of display areas at different driving frequencies while providing a split display function for displaying different screens through divided display areas.

Additional aspects will be set forth in part in the description which follows and, in part, will be apparent from the description, or may be learned by practice of the presented embodiments.

In accordance with an aspect of the disclosure, an electronic device is provided. The electronic device includes a display panel, a display driver integrated circuit (DDIC) configured to drive the display panel, and a processor, wherein the processor may be configured to control the DDIC to drive the display panel in a split screen state based on a user input, wherein the split screen state may include a state in which an entire display area of the display panel is divided into a plurality of areas and in which the plurality of areas are driven independently each other, to execute a first application, to execute a second application, to execute a third application, to determine a first driving frequency configured by the first application and a position of a first part on which a first execution screen of the first application is to be displayed, to determine a second driving frequency configured by the second application and a position of a second part on which a second execution screen of the second application is to be displayed, to determine a third driving frequency configured by the third application and a position of a third part on which a third execution screen of the third application is to be displayed, to determine whether the first part and the second part are disposed adjacent to each other in a direction perpendicular to a scan direction of the display panel, to calculate a least common multiple of the first driving frequency and the second driving frequency when the first part and the second part are disposed adjacent to each other in a direction perpendicular to a scan direction of the display panel, to control the DDIC to drive a first area of the display panel including the first part and the second part of the display panel based on a first partial refresh rate corresponding to the least common multiple, and to control the DDIC to drive a second area of the display panel including a third part of the display panel based on a second partial refresh rate corresponding to the third driving frequency.

In accordance with another aspect of the disclosure, a method of driving an electronic device is provided. The method includes executing a first application, executing a second application, executing a third application, determining a first driving frequency configured by the first application and a position of a first part on which a first execution screen of the first application is to be displayed, determining a second driving frequency configured by the second application and a position of a second part on which a second execution screen of the second application is to be displayed, determining a third driving frequency configured by the third application and a position of a third part on which a third execution screen of the third application is to be displayed, determining whether the first part and the second part are disposed adjacent to each other in a direction perpendicular to a scan direction of the display panel, calculating, when the first part and the second part are disposed adjacent to each other in a direction perpendicular to the scan direction of the display panel, a least common multiple of the first driving frequency and the second driving frequency, controlling a display driver integrated circuit (DDIC) to drive a first area of the display panel including the first part and the second part of the display panel based on a first partial refresh rate corresponding to the least common multiple, and controlling the DDIC to drive a second area of the display panel including the third part of the display panel based on a second partial refresh rate corresponding to the third driving frequency.

An electronic device and method according to various embodiments of this document, by driving a plurality of display areas at different driving frequencies while providing a split display function for displaying different screens through divided display areas, it is possible to reduce waste of power consumption due to unnecessary high refresh rate driving while providing an optimal screen to users.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

Figure 1:
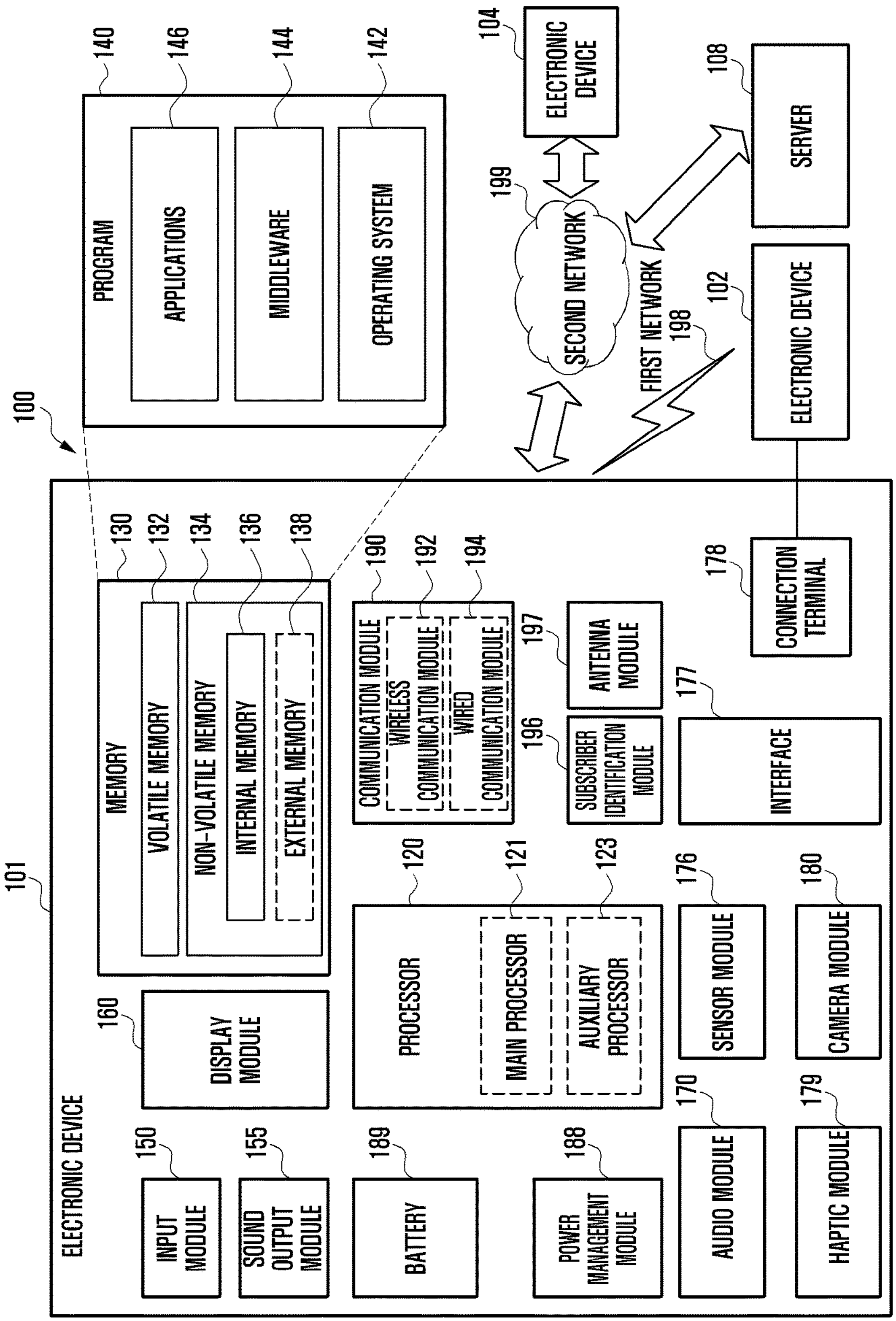
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it denotes that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
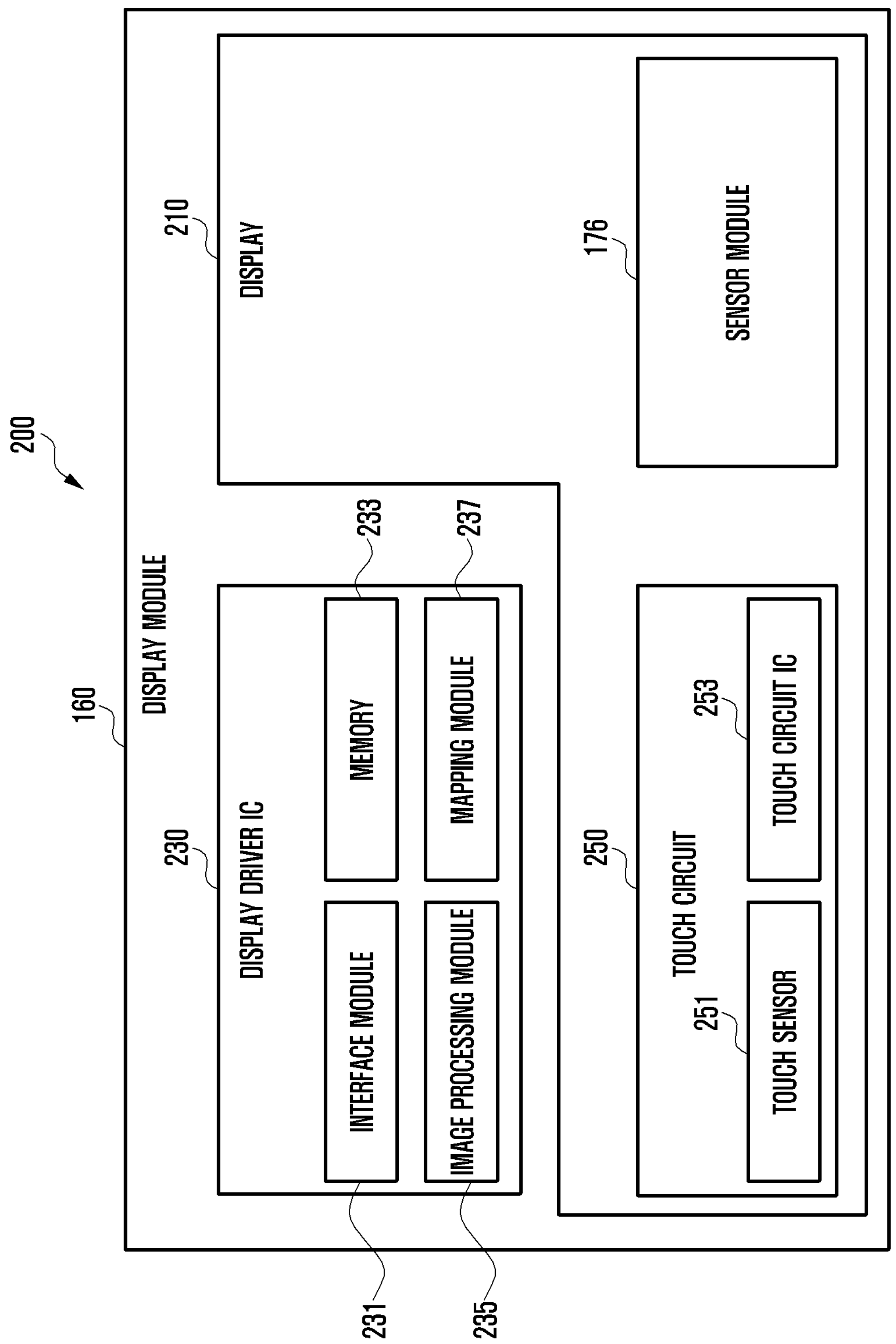
FIG. 2 is a block diagram illustrating a display module according to an embodiment of the disclosure.

FIG. 2 is a block diagram illustrating a display module according to an embodiment of the disclosure.

Referring to FIG. 2 depicting block diagram 200, the display module 160 may include a display 210 and a display driver integrated circuit (DDIC) 230 for controlling the display 210. The DDIC 230 may include an interface module 231, a memory 233 (e.g., a buffer memory 350), an image processing module 235, or a mapping module 237. The DDIC 230 may receive, for example, image data or image information including image control signals corresponding to commands for controlling the image data from other components of the electronic device 101 through the interface module 231. For example, according to an embodiment, the image information may be received from the processor 120 (e.g., the main processor 121 (e.g., application processor) or the auxiliary processor 123 (e.g., graphic processor) operated independently of a function of the main processor 121. The DDIC 230 may, communicate with a touch circuit 250 or the sensor module 176 through the interface module 231. Further, the DDIC 230 may store at least a portion of the received image information in the memory 233, for example, in units of frames. The image processing module 235 may perform, for example, preprocessing or postprocessing (e.g., resolution, brightness, or size adjustment) of at least a portion of the image data based on at least characteristics of the image data or characteristics of the display 210. The mapping module 237 may generate a voltage value or a current value corresponding to the preprocessed or postprocessed image data through the image processing module 135. According to an embodiment, the generation of the voltage value or the current value may be performed based on at least partially an attribute of pixels (e.g., an array (red green blue (RGB) stripe or pentile structure) of pixels or a size of each sub-pixel) of the display 210. As at least some pixels of the display 210 are driven, for example, based on at least partially the voltage value or the current value, visual information (e.g., text, image, or icon) corresponding to the image data may be displayed through the display 210.

According to an embodiment, the display module 160 may further include a touch circuit 250. The touch circuit 250 may include a touch sensor 251 and a touch sensor integrated circuit (IC) 253 for controlling the touch sensor 251. The touch sensor IC 253 may control the touch sensor 251 in order to detect, for example, a touch input or a hovering input to a specific position of the display 210. For example, the touch sensor IC 253 may measure a change in a signal (e.g., voltage, light amount, resistance, or charge amount) for a specific position of the display 210 to detect a touch input or a hovering input. The touch sensor IC 253 may provide information (e.g., position, area, pressure, or time) on the detected touch input or hovering input to the processor 120. According to an embodiment, at least a part (e.g., the touch sensor IC 253) of the touch circuit 250 may be included as the DDIC 230, a part of the display 210, or a part of other components e.g.; the auxiliary processor 123) disposed outside the display, module 160.

According to an embodiment, the display module 160 may further include al least one sensor (e.g., fingerprint sensor, iris sensor, pressure sensor, or illumination sensor) of the sensor module 176 or a control circuit for the sensor. In this case, the at least one sensor or the control circuit thereof may be embedded in a part (e.g., the display 210 or the DDIC 230) of the display module 160 or a part of the touch circuit 250. For example, in the case that the sensor module 176 embedded in the display module 160 includes a biometric sensor (e.g., fingerprint sensor), the biometric sensor may acquire biometric information (e.g., fingerprint image) associated with a touch input through a partial area of the display 210. For another example, in the case that the sensor module 176 embedded in the display module 160 includes a pressure sensor, the pressure sensor may acquire pressure information associated with a touch input through a partial area or the entire area of the display 210. According to an embodiment, the touch sensor 251 or the sensor module 176 may be disposed between pixels of a pixel layer of the display 210 or above or below the pixel layer.

Figure 3:
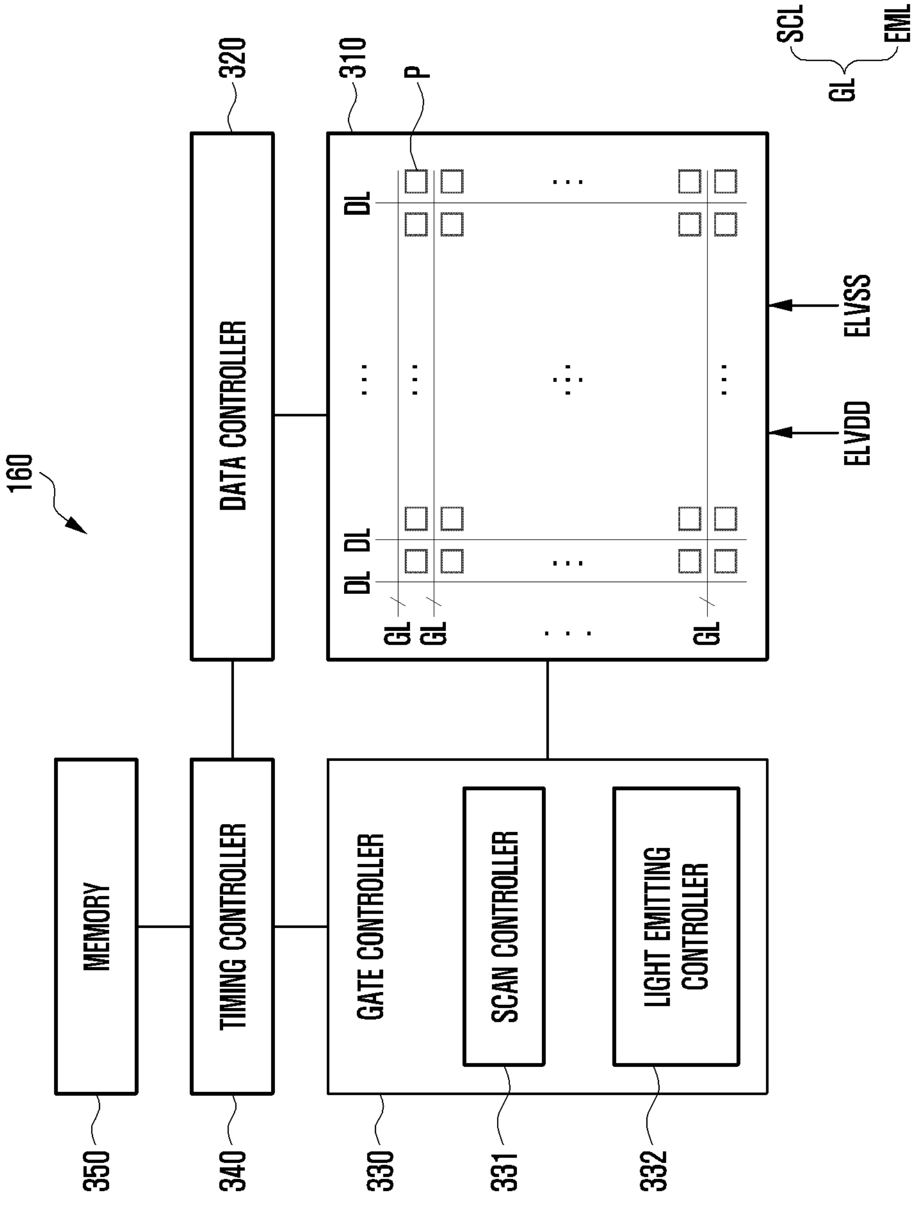
FIG. 3 is a block diagram illustrating a display module according to an embodiment of the disclosure.

FIG. 3 is a block diagram illustrating a display module according to an embodiment of the disclosure.

The display module 160 illustrated in FIG. 3 may be at least partially similar to or different from the display module 160 illustrated in FIGS. 1 and/or 2. Hereinafter, features of the display module 160 that is not described or changed will be mainly described with reference to FIG. 3.

Referring to FIG. 3, the display module 160 according to an embodiment may include a display panel 310, a data controller 320, a gate controller 330, a timing controller 340, and/or a memory 350 (e.g., dynamic random access memory (DRAM)).

According to various embodiments, at least a portion of the data controller 320, the gate controller 330, the timing controller 340, and/or the memory 350 (e.g., DRAM) may be included in the DDIC 230 (e.g., the DDIC 230 of FIG. 2). According to an embodiment, the data controller 320, the timing controller 340, and/or the memory 350 (e.g., DRAM) may be included in the DDIC 230 (e.g., the DDIC 230 of FIG. 2), and the gate controller 330 may be disposed in a non-display area (not illustrated) of the display panel 310.

According to an embodiment, the display panel 310 may include a plurality of gate lines GL and a plurality of data lines DL. According to an embodiment, the plurality of gate lines GL may be formed, for example, in a first direction (e.g., a horizontal direction in FIG. 3) and be disposed at predetermined intervals. According to an embodiment, the plurality of data lines DL may be formed in, for example, a second direction (e.g., a vertical direction in FIG. 3) perpendicular to the first direction and be disposed at designated intervals. In various embodiments of this document, a "scan direction of the display panel 310" may be defined to a direction perpendicular to a direction in which the gate lines GL are formed. For example, in the case that the plurality of gate lines GL are formed in a first direction (e.g., a horizontal direction in FIG. 3), the scan direction of the display panel 310 may be defined to a second direction (e.g., a vertical direction in FIG. 3) perpendicular to the first direction.

According to an embodiment, a pixel P may be disposed in each of partial areas of the display panel 310 in which the plurality of gate lines GL and the plurality of data lines DL intersect. According to an embodiment, each pixel P may display a designated gray level as it is electrically connected to the gate line GL and the data line DL.

According to an embodiment, each pixel P may receive a scan signal and a light emitting signal through the gate line GL and receive a data signal through the data line DL. According to an embodiment, each pixel P may receive a high potential voltage (e.g., ELVDD voltage) and a low potential voltage (e.g., ELVSS voltage) as a power source for driving an organic light emitting diode (OLED).

According to an embodiment, each pixel P may include an OLED and a pixel driving circuit (not illustrated) for driving the GELD. According to various embodiments, a structure of each pixel P and a structure of the pixel driving circuit may be at least partially similar to or identical to a structure of the pixel P and a pixel driving circuit disclosed in Korean Patent Registration No. 110-2189223. According to an embodiment, the pixel driving circuit disposed in each pixel P may control the on (e.g., active state) or off (e.g., inactive state) of the OLED based on a scan signal and a light emitting signal. According to an embodiment, when the OLED of each pixel P is turned to an on state (e.g., active state), a gray level (e.g., luminance) corresponding to the data signal may be displayed during 1 frame period.

According to an embodiment, the data controller 320 may drive a plurality of data lines DL. According to an embodiment, the data controller 320 may receive at least one synchronization signal and data signal (e.g., digital image data) from the timing controller 340 or the processor 120 (e.g., the processor 120 of FIG. 1). According to an embodiment, the data controller 320 may determine a data voltage (e.g., analog image data) corresponding to an input data signal using a reference gamma voltage and a designated gamma curve. According to an embodiment, the data controller 320 may apply the data voltage to the plurality of data lines DL to supply the data voltage to each pixel P.

Figure 4:
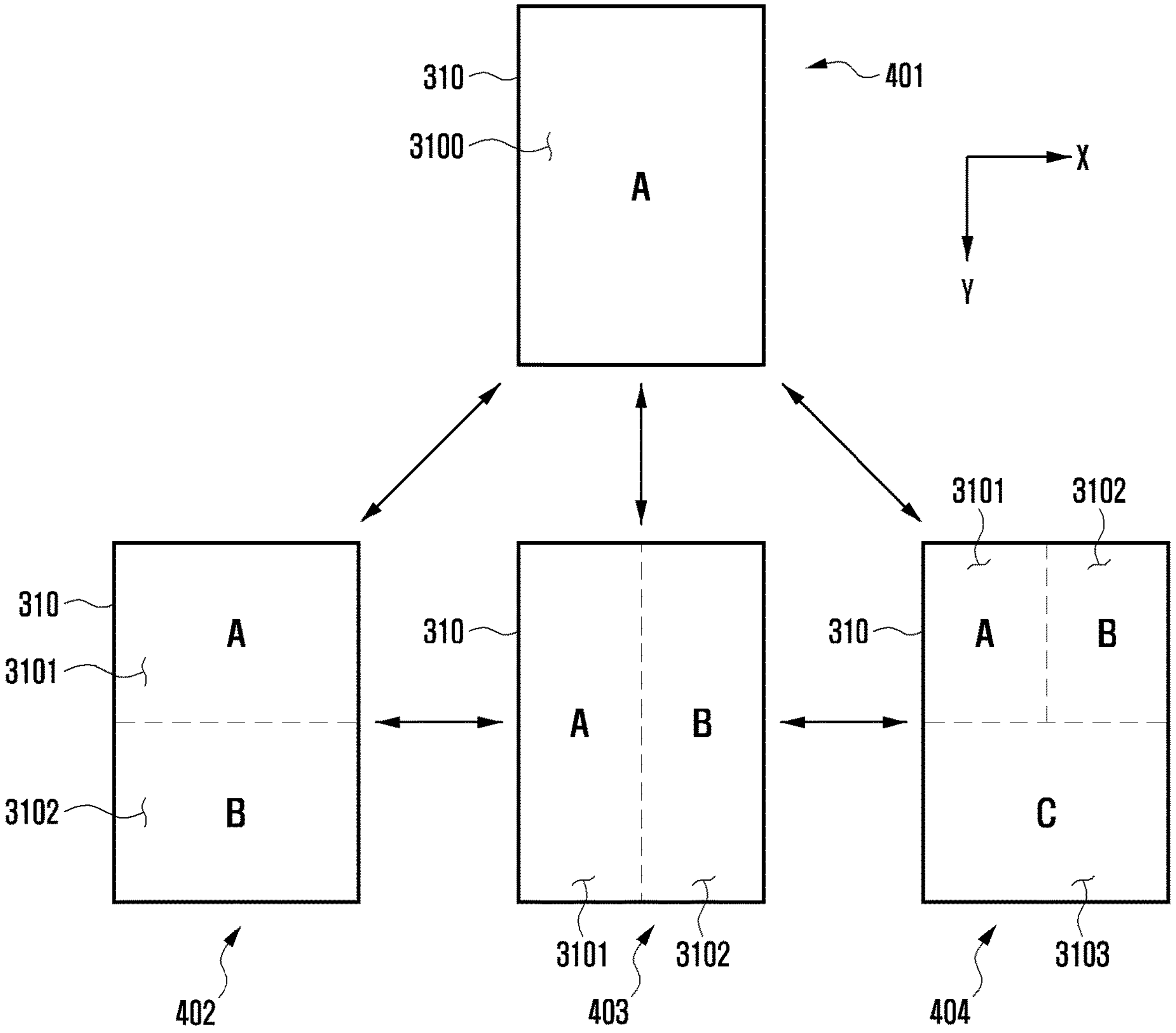
FIG. 4 is a diagram illustrating a state in which an electronic device drives a display in a split screen according to an embodiment of the disclosure.

According to an embodiment, the data controller 320 may receive a plurality of synchronization signals having different frequencies from the timing controller 340 or the processor 120 (e.g., the processor 120 of FIG. 1). For example, the data controller 320 may receive a first synchronization signal having a first frequency (e.g., 30 Hz), a second synchronization signal having a second frequency (e.g., 60 Hz) greater than the first frequency, and a third synchronization signal having a third frequency (e.g., 120 Hz) greater than the second frequency. According to an embodiment, the plurality of synchronization signals may be frequency control signals generated by the processor 120 when the electronic device 101 drives the display in a split screen mode, as illustrated in FIG. 4. For example, the processor 120 may execute a first application and a second application, display an execution screen of the first application through a first part 3101 of the display panel 310, and display an execution screen of the second application through a second part 3102 of the display panel 310. The processor 120 may control a driving frequency of the execution screen of the first application displayed through the first part 3101 and a driving frequency of the execution screen of the second application displayed through the second part 3102 independently each other. For example, the processor 120 may control the first part 3101 with a first driving frequency according to a configuration of the first application, and control the second part 3102 with a second driving frequency according to a configuration of the second application. According to an embodiment, the processor 120 may supply a first synchronization signal corresponding to the first driving frequency to the data controller 320 in order to control the first part 3101 with the first driving frequency and supply a second synchronization signal corresponding to the second driving frequency to the data controller 320 in order to control the second part 3102 with the second driving frequency. According to an embodiment, the data controller 320 may apply a data voltage corresponding to a first driving frequency to some data lines DL corresponding to the first part 3101 among a plurality of data lines DL and apply a data voltage corresponding to the second driving frequency to some data lines DL corresponding to the second part 3102 among the plurality of data lines DL.

In various embodiments of this document, the face that "the electronic device 101 drives the display in a split screen" may be defined to a state that the electronic device 101 divides the display into a plurality of areas and that the plurality of divided areas displays different screens. For example, a split screen state (e.g., split screen mode) of the electronic device 101 may be defined to a state that a plurality of divided areas display independently different screens, but that the sum of the plurality of divided areas corresponds to an area of the entire display area. In various embodiments of this document, the split screen state may be defined as including a picture in picture (PIP) state (e.g., PIP mode) in which some execution screens are displayed in a pop-up form.

According to an embodiment, the gate controller 330 may drive a plurality of gate lines GL. According to an embodiment, the gate controller 330 may receive at least one synchronization signal from the timing controller 340 or the processor 120 (e.g., the processor 120 of FIG. 1). According to an embodiment, the gate controller 330 may include a scan controller 331 that sequentially generates a plurality of scan signals based on the synchronization signal and that supplies the plurality of generated scan signals to the gate line GL. According to an embodiment, the gate controller 330 may further include a light emitting controller 332 that sequentially generates a plurality of light emitting signals based on the synchronization signal and that supplies the plurality of generated light emitting signals to the gate line GL. For example, each gate line GL may include a scan signal line SCL to which a scan signal is applied and/or a light emitting signal line EMI, to which a light emitting signal is applied.

According to an embodiment, the gate controller 330 may receive a masking signal from the timing controller 340 or the processor 120 (e.g., the processor 120 of FIG. 1). According to an embodiment, the gate controller 330 may not supply at least one of a scan signal and/or a light emitting signal to at least some gate lines GL of the display panel 310 based on the masking signal. For example, the gate controller 330 may supply a scan signal and/or a light emitting signal to at least some of the plurality of gate lines GL based on the masking signal but may not supply a scan signal and/or a light emitting signal to the remaining gate lines GL. According to an embodiment, among a plurality of pixels disposed in the display panel 310, pixels connected to gate lines GL to which scan signals and/or light emitting signals are not supplied may be turned off (e.g., inactivated state) during a corresponding frame period. In various embodiments, an operation in which the gate controller 330 receives a masking signal from the timing controller 340 or the processor 120 (e.g., the processor 120 of FIG. 1) may be omitted.

According to an embodiment, the gate controller 330 may receive a plurality of synchronization signals having different frequencies from the timing controller 340 or the processor 120 (e.g., the processor 120 of FIG. 1). For example, the gate controller 330 may receive a first synchronization signal having a first frequency (e.g., 30 Hz), a second synchronization signal having a second frequency (e.g., 60 Hz) greater than the first frequency, and a third synchronization signal having a third frequency (e.g., 120 Hz) greater than the second frequency. According to an embodiment, the plurality of synchronization signals may be frequency control signals generated by the processor 120 when the electronic device 101 drives the display in a split screen mode, as illustrated in FIG. 4. For example, the processor 120 may execute a first application and a second application, display an execution screen of the first application through the first part 3101 of the display panel 310, and display an execution screen of the second application through the second part 3102 of the display panel 310. The processor 120 may control a driving frequency of the execution screen of the first application displayed through the first part 3101 and a driving frequency of the execution screen of the second application displayed through the second part 3102 independently each other. For example, the processor 120 may control the first part 3101 with a first driving frequency according to a configuration of the first application, and control the second part 3102 with a second driving frequency according to a configuration of the second application. According to an embodiment, the processor 120 may supply a first synchronization signal corresponding to the first driving frequency to the gate controller 330 in order to control the first part 3101 with the first driving frequency and supply a second synchronization signal corresponding to the second driving frequency to the gate controller 330 in order to control the second part 3102 with the second driving frequency. According to an embodiment, the gate controller 330 may apply a scan signal and/or a light emitting signal corresponding to a first driving frequency to some gate lines GL corresponding to the first part 3101 among a plurality of gate lines GL and apply a scan signal and/or a light emitting signal corresponding to the second driving frequency to some gate lines GL corresponding to the second part 3102 among the plurality of gate lines GL.

According to an embodiment, the timing controller 340 may control driving timing of the gate controller 330 and the data controller 320. According to an embodiment, the timing controller 340 may acquire a data signal (e.g., digital image data) of 1 frame. According to an embodiment, the timing controller 340 may receive a data signal of 1 frame from the processor 120. According to an embodiment, the timing controller 340 may refer to the memory 350 (e.g., DRAM) that stores a data signal of a previous frame so that at a least a portion of the display panel 310 displays an image of the previous frame based on a specified event.

According to an embodiment, the timing controller 340 may convert an acquired data signal (e.g., digital image data) to correspond to the resolution of the display panel 310 and supply the converted data signal to the data controller 320.

FIG. 4 is a diagram illustrating a state in which an electronic device drives a display in a split screen according to an embodiment of the disclosure.

Referring to FIG. 4, the electronic device 101 according to various embodiments may control the display panel 310 in a normal screen state (e.g., normal screen mode) or in a split screen state (e.g., split screen mode). For example, state 401 of FIG. 4 may be an example representing a normal screen state of the electronic device 101. For example, states 402, 403, and 404 of FIG. 4 may be examples indicating a split screen state of the electronic device 101. The electronic device 101 according to various embodiments may control the transition between a normal screen state (e.g., normal screen mode) and a split screen state (e.g., split screen mode) based on a user's designated input or designated gesture input. For example, the electronic device 101 may control the transition between states 401, 402, 403, and/or 404 based on a user's designated input or designated gesture input.

In state 401, the electronic device 101 according to an embodiment may control the display panel 310 to a normal screen state. According to an embodiment, the electronic device 101 may display an execution screen corresponding to a single application (or a user interface (UI) corresponding to a single application) through an entire display area 3100 of the display panel 310. According to an embodiment, the electronic device 101 may drive the entire display area 3100 of the display panel 310 with a designated driving frequency configured by the single application. For example, the single application may be configured to display an execution screen at 60 Hz, and the electronic device 101 may control the display panel 310 so that the entire display area 3100 of the display panel 310 displays an execution screen of the application based on a driving frequency of 60 Hz.

In state 402, the electronic device 101 according to an embodiment may display a first execution screen A of a first application through the first part 3101 of the display panel 310 and display a second execution screen B of a second application through the second part 3102 of the display panel 310. In the illustrated example, the scan direction of the display panel 310 may be the Y direction, and the first part 3101 and the second part 3102 may be disposed adjacent to each other in the scan direction of the display panel 310.

In state 403, the electronic device 101 according to an embodiment may display the first execution screen A of the first application through the first part 3101 of the display panel 310 and display the second execution screen B of the second application through the second part 3102 of the display panel 310. In the illustrated example, the scan direction of the display panel 310 may be in the Y direction, and the first part 3101 and the second part 3102 may be disposed adjacent to each other in the X direction perpendicular to the scan direction of the display panel 310.

In state 404, the electronic device 101 according to an embodiment may display the first execution screen A of the first application through the first part 3101 of the display panel 310, display the second execution screen B of the second application through the second part 3102 of the display panel 310, and display a third execution screen C of the third application through a third part 3103 of the display panel 310. In the illustrated example, a scan direction of the display panel 310 may be in a Y direction, the first part 3101 and the second part 3102 may be disposed adjacent to each other in an X direction perpendicular to the scan direction of the display panel 310, and the third part 3103 may be disposed adjacent to the first part 3101 (or the second part 3102) in the scan direction. According to an embodiment, a width of the third part 3103 may be substantially the same as the sum of a width of the first part 3101 and a width of the second part 3102. According to an embodiment, the sum of an area of the first part 3101, an area of the second part 3102, and an area of the third part 3103 may be substantially the same as an area of the entire display area 3100 of the display panel 310. According to an embodiment, the size and/or disposition of the first part 3101, the second part 3102, and the third part 3103 may be varied by a user's input.

The electronic device (e.g., the electronic device 101 of FIG. 1) according to various embodiments of this document may include a display panel (e.g., the display panel 310 of FIG. 3), a display driver integrated circuit (DDIC) (e.g., the DDIC 230 of FIG. 2) for driving the display panel 310, and a processor (e.g., the processor 120 of FIG. 1), and the processor 120 may control the DDIC 230 to drive the display panel 310 in a split screen state based on a user input, wherein the split screen state may include a state in which the entire display area (e.g., the entire display area 3100 of FIG. 4) of the display panel 310 is divided into a plurality of areas and in which the plurality of areas are driven independently each other, wherein the processor 120 may execute a first application, execute a second application, determine a first driving frequency configured by the first application, determine a second driving frequency configured by the second application, calculate the least common multiple of the first driving frequency and the second driving frequency, drive an entire display area 3100 of the display panel 310 based on the full screen refresh rate corresponding to the least common multiple, supply first data for displaying a first execution screen of the first application to the DDIC 230 at every first period corresponding to the first driving frequency while the display panel 310 is driven at the full screen refresh rate, supply second data for displaying a second application screen of the second application to the DDIC 230 at every second period corresponding to the second driving frequency while the display panel 310 is driven at the full screen refresh rate, control the DDIC 230 to display the first execution screen through the first part 3101 of the display panel 310 based on the first data, and control the DDIC 230 to display the second execution screen through the second part 3102 of the display panel 310 based on the second data.

According to an embodiment, the processor 120 may supply the first data and the second data to the DDIC 230 during a first frame, control the DDIC 230 to update the first execution screen and the second execution screen displayed through the display panel 310 during the first frame, supply the second data to the DDIC 230 during a second frame, but not supply the first data to the DDIC 230, control the DDIC 230 to update the second execution screen displayed through the display panel 310 during the second frame, and control the first execution screen to maintain an image of the first frame.

The electronic device 101 according to various embodiments of this document may include a display panel 310, a display driver integrated circuit (DDIC 230) for driving the display panel 310, and a processor 120, and the processor 120 may, control the DDIC 230 to drive the display panel 310 in a split screen state based on a user input, but the split screen state may include a state in which an entire display area 3100 of the display panel 310 is divided into a plurality of areas and in which the plurality of areas are driven independently each other, the processor 120 may execute a first application, execute a second application, execute a third application, determine a first driving frequency configured by the first application and a position of a first part 3101 on which a first execution screen of the first application is to be displayed, determine a second driving frequency configured by the second application and a position of a second part 3102 on which a second execution screen of the second application is to be displayed, determine a third driving frequency configured by a third application and a position of the third part 3103 on which a third execution screen of the third application is to be displayed, determine whether the first part 3101 and the second part 3102 are disposed adjacent to each other in a direction perpendicular to a scan direction of the display panel 310, calculate the least common multiple of the first driving frequency and the second driving frequency when the first part 3101 and the second part 3102 are disposed adjacent to each other in a direction perpendicular to a scan direction of the display panel 310, control the DDIC 230 to drive a first area of the display panel 310 including the first part 3101 and the second part 3102 of the display panel 310 based on a refresh rate of the first part 3101 corresponding to the least common multiple, and control the DDIC 230 to drive a second area of the display panel 310 including the third part 3103 of the display panel 310 based on a refresh rate of the second part 3102 corresponding to the third driving frequency.

According to an embodiment, the processor 120 may determine whether at least one area of the first part 3101 to the third part 3103 is continuously connected without being segmented along the scan direction and has substantially the same width as a horizontal width or a vertical width of the entire display area 3100 of the display panel 310, calculate a least common multiple of the first driving frequency to the third driving frequency based on the determination, and control the DDIC 230 to drive the first area and the second area based on a full screen refresh rate based on the calculated lowest common multiple of the first driving frequency to the third driving frequency.

According to an embodiment, the display panel 310 may include a plurality of gate lines disposed at intervals along the scan direction and a plurality of data lines disposed to cross the gate lines, and the processor 120 may calculate a turn-on period of a first scan signal corresponding to a refresh rate of the first part 3101 and a turn-on period of a second scan signal corresponding to a refresh rate of the second part 3102, and if the turn-on period of the second scan signal is shorter than that of the first scan signal, the DDIC 230 may control to supply a plurality of scan signals having the turn-on period of the second scan signal to a plurality of gate lines disposed at the first area and the second area, respectively.

According to an embodiment, the processor 120 may control the DDIC 230 to supply first data of the first application or second data of the second application to the plurality of data lines in synchronization with a plurality of scan signals having the turn-on period of the second scan signal.

According to an embodiment, the processor 120 may display a black line having a specified width at a boundary between the first area and the second area.

According to an embodiment, the processor 120 may control the DDIC 230 to insert a specified delay time between a driving time of the first area and a driving time of the second area.

According to an embodiment, the processor 120 may receive a designated event for rotating a screen while the DDIC 230 drives the first area of the display panel 310 based on a refresh rate of the first part 3101 and drives a second area based on a refresh rate of the second part 3102, change a layout displayed by the first part 3101 to the third part 3103 in the entire display screen based on the event, determine whether at least one area among the first part 3101 to the third part 3103 is continuously connected without being segmented along the scan direction and has substantially the same width as a horizontal width or a vertical width of the entire display area 3100 of the display panel 310, calculate a least common multiple of the first driving frequency to the third driving frequency based on the determination, and control the DDIC 230 to drive the first area and the second area based on a full screen refresh rate based on the calculated least common multiple of the first driving frequency to the third driving frequency.

According to an embodiment, the (processor 120 may determine data signals supplied to each of the first area and the second area using one piece of gamma data.

According to an embodiment, if the refresh rate of the first part 3101 is smaller than a reference frequency, the processor 120 may change the refresh rate of the first part 3101 to a value greater than or equal to the reference frequency.

According to an embodiment, if the refresh rate of the first part 3101 is smaller than the reference frequency, the processor 120 may control the DDIC 230 to drive the first part 3101 with a refresh rate corresponding to a multiple of the refresh rate of the first part 3101.

A method of driving the electronic device 101 according to various embodiments of this document may include an operation of executing a first application, an operation of executing a second application, an operation of executing a third application, an operation of determining a first driving frequency configured by the first application and a position of a first part 3101 on which a first execution screen of the first application is to be displayed, an operation of determining a second driving frequency configured by a second application anti a position of a second part 3102 on which a second execution screen of the second application is to be displayed, an operation of determining a third driving frequency configured by a third application and a position of a third part 3103 on which a third execution screen of the third application is to be displayed, an operation of determining whether the first part 3101 and the second part 3102 are disposed adjacent to each other in a direction perpendicular to a scan direction of the display panel 310, an operation of calculating a least common multiple of the first driving frequency and the second driving frequency when the first part 3101 and the second part 3102 are disposed adjacent to each other in a direction perpendicular to a scan direction of the display panel 310, an operation of controlling the display driver integrated circuit (DDIC) 230 to drive the first area of the display panel 310 including the first part 3101 and the second part 3102 of the display panel 310 based on a refresh rate of the first part 3101 corresponding to the least common multiple, and an operation of controlling the DDIC 230 to drive the second area of the display panel 310 including the third part 3103 of the display panel 310 based on a refresh rate of the second part 3102 corresponding to the third driving frequency.

According to an embodiment, the method may further include an operation of determining whether at least one area of the first part 3101 to the third part 3103 is continuously connected without being segmented along the scan direction and has substantially the same width as a horizontal width or a vertical width of the entire display area 3100 of the display panel 310, an operation of calculating a least common multiple of the first driving frequency to the third driving frequency based on the determination, and an operation of controlling the DDIC 230 to drive the first area and the second area based on a full screen refresh rate based on the calculated least common multiple of the first driving frequency to the third driving frequency.

According to an embodiment, the display panel 310 may include a plurality of gate lines disposed at intervals along the scan direction and a plurality of data lines disposed to cross the gate lines, and the method may further include an operation of calculating a turn-on period of the first scan signal corresponding to a refresh rate of the first part 3101 and a turn-on period of a second scan signal corresponding to a refresh rate of the second part 3102, and an operation of controlling the DDIC 230 to supply a plurality of scan signals having a turn-on period of the second scan signal to the plurality of gate lines disposed in the first area and the second area, respectively, if the turn-on period of the second scan signal is shorter than that of the first scan signal.

According to an embodiment, the method may further include an operation of controlling the DDIC 230 to supply first data of the first application or second data of the second application to the plurality of data lines in synchronization with a plurality of scan signals having a turn-on period of the second scan signal.

According to an embodiment, the method may further include an operation of displaying a black line having a specified width at a boundary between the first area and the second area.

According to an embodiment, the method may further include an operation of controlling the DDIC 230 to insert a specified delay time between a driving time of the first area and a driving time of the second area.

According to an embodiment, the method may further include an operation of driving, by the DDIC 230, a first area of the display panel 310 based on a refresh rate of the first part 3101, an operation of receiving a designated event for rotating a screen while driving the second area based on a refresh rate of the second part 3102, an operation of changing a layout in which the first part 3101 to the third part 3103 are displayed on the entire display screen based on the event, an operation of determining whether at least one area of the first part 3101 to the third part 3103 is continuously connected without being segmented along the scan direction and has substantially the same width as a horizontal width or a vertical width of the entire display area 3:100 of the display panel 310, an operation of calculating a least common multiple of the first driving frequency to the third driving frequency based on the determination, and an operation of controlling the DDIC 230 to drive the first area and the second area based on a full screen refresh rate based on the calculated least common multiple of the first driving frequency to the third driving frequency.

According to an embodiment, the method may further include an operation of determining data signals supplied to each of the first area and the second area using one piece of gamma data.

Figure 5A:
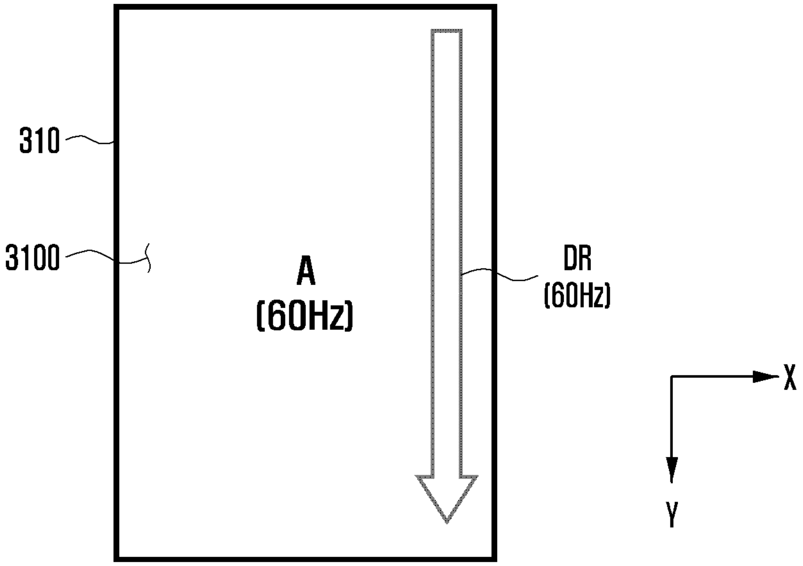
FIG. 5A is a diagram illustrating an example of a driving frequency driving a display panel when an electronic device is in a normal screen state according to an embodiment of the disclosure.

FIG. 5A is a diagram illustrating an example of a driving frequency driving a display panel when an electronic device is in a normal screen state according to an embodiment of the disclosure.

Referring to FIG. 5A, the electronic device 101 according to various embodiments may control the display panel 310 to a normal screen state. According to an embodiment, the electronic device 101 may display an execution screen corresponding to a single application (or a user interface (UI) corresponding to a single application) through the entire display area 3100 of the display panel 310. According to an embodiment, the electronic device 101 may drive the entire display area 3100 of the display panel 310 with a designated driving frequency configured by the single application. For example, the single application may be configured to display an execution screen at 60 Hz, and the electronic device 101 may control the display panel 310 so that the entire display area 3100 of the display panel 310 displays the execution screen of the application based on the driving frequency of 60 Hz.

Figure 5B:
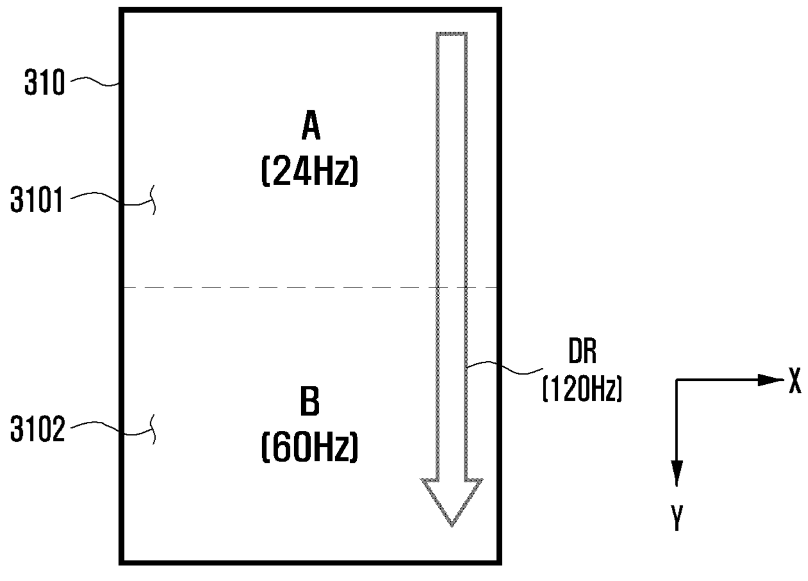
FIG. 5B is a diagram illustrating an example of a driving frequency driving a display panel when an electronic device is in a split screen state according to an embodiment of the disclosure.

FIG. 5B is a diagram illustrating an example of a driving frequency driving a display panel when an electronic device is in a split screen state according to an embodiment of the disclosure.

Figure 5C:
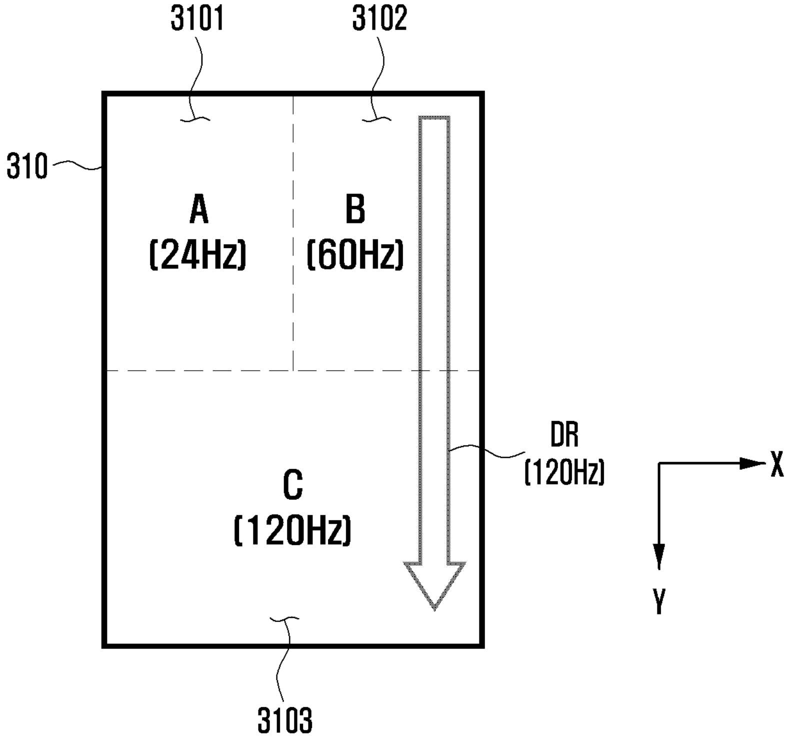
FIG. 5C is a diagram illustrating another example of a driving frequency driving a display panel when an electronic device is in a split screen state according to an embodiment of the disclosure.

FIG. 5C is a diagram illustrating another example of a driving frequency driving a display panel when an electronic device is in a split screen state according to an embodiment of the disclosure.

Figure 5D:
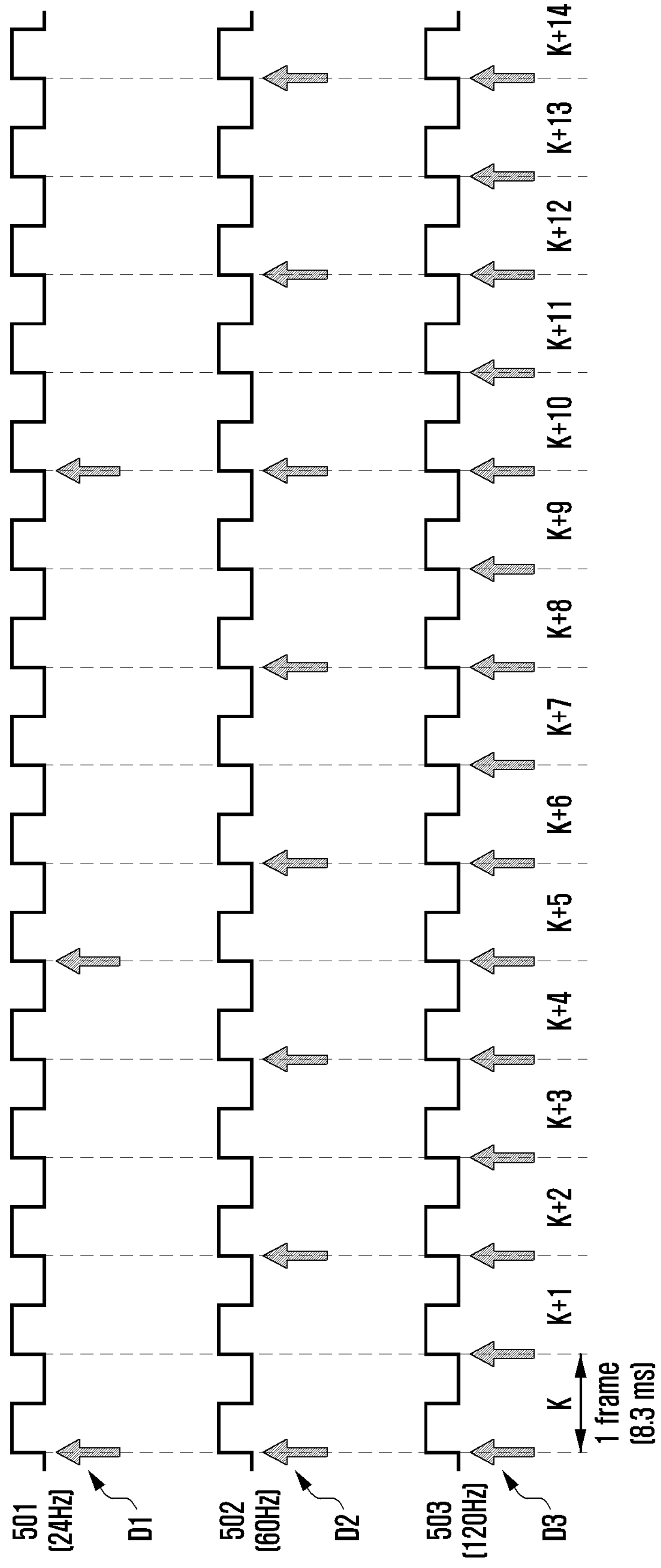
FIG. 5D is a diagram illustrating a data input to each part of a display panel in the split screen state illustrated in FIG. 5C according to an embodiment of the disclosure.

FIG. 5D is a diagram illustrating a data input to each part of a display panel in the split screen state illustrated in FIG. 5C according to an embodiment of the disclosure.

Figure 6:
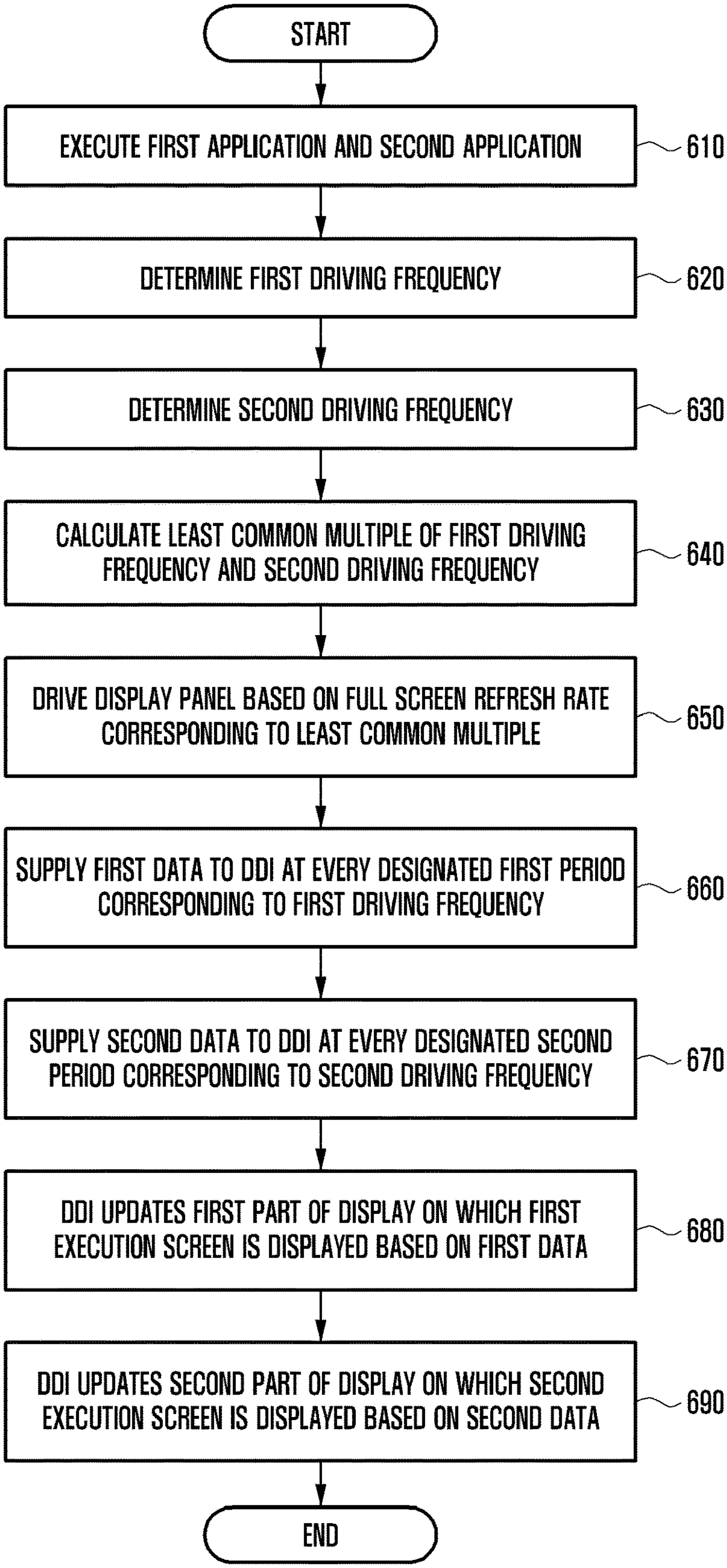
FIG. 6 is a flowchart illustrating an operation of driving a display panel when an electronic device is in a split screen state according to an embodiment of the disclosure.

FIG. 6 is a flowchart illustrating an operation of driving a display panel when an electronic device is in a split screen state according to an embodiment of the disclosure.

At least some of the operations illustrated in FIG. 6 may be omitted. Before or after at least some operations illustrated in FIG. 6, at least some operations mentioned Referring to other drawings in this document may be additionally inserted. Operations illustrated in FIG. 6 may be performed by the processor 120 (e.g., the processor 120 of FIG. 1). For example, the memory 350 (e.g., the memory 130 of FIG. 1)

of the electronic device 101 may store instructions that, when executed, allow the processor 120 to perform at least some operations illustrated in FIG. 6.

According to various embodiments, the electronic device 101 may control the display panel 310 to a split screen state, as illustrated in FIGS. 5B and 5C. For example, the electronic device 101 may execute a plurality of applications and determine a driving frequency driving the entire display area 3100 based on at least a driving frequency for each partial area configured by each of the plurality of applications. Hereinafter, an operation of driving the display panel 310 when the electronic device 101 is in a split screen state will be described with reference to FIGS. 5B, 5C, and 6.

According to various embodiments, a state in which the electronic device 101 drives the display in a split screen may include a state that the electronic device 101 displays an execution screen corresponding to a single application through the entire display area 3100 of the display panel 310, but differently controls driving frequencies for each partial area of the display panel 310 based on an attribute of each area of the execution screen. For example, the electronic device 101 may display an execution screen corresponding to a single application and identify an attribute of each area of the execution screen. The attribute of each area of the execution screen may include a sub-screen displaying a video, a sub-screen displaying a text, or a sub-screen displaying a fixed image (or a screen that does not change during a designated frame). For example, the electronic device 101 may execute a video playback application. An execution screen of the video playback application may include at least one first sub-screen configured to display a video and at least one second sub-screen configured to display, a text (or fixed image). The electronic device 101 according to various embodiments may display an execution screen of a single application (e.g., video playback application) in a split screen driving state, but control differently a driving frequency of a part (e.g., the first part 3101 of FIG. 5B) of the display panel 310 configured to display a first sub-screen and a driving frequency of another part (e.g., the second part 3102 of FIG. 5B) of the display panel 310 configured to display a second sub-screen.

According to various embodiments, an operation of driving the display into a split screen by the electronic device 101 may include an operation of executing a first application, an operation of identifying an attribute of each area of an execution screen of the first application, an operation of determining a first driving frequency corresponding to a first sub-screen of an execution screen of the first application having a first attribute and a position of a first part on which the first sub-screen is to be displayed, an operation of determining a second driving frequency corresponding to a second sub-screen of an execution screen of the first application having a second attribute and a position of a second part on which the second sub-screen is to be displayed, an operation of determining a third driving frequency corresponding to a third sub-screen of an execution screen of the first application having a third attribute and a position of a third part on which a third sub-screen is to be displayed, an operation of determining whether the first part and the second part are disposed adjacent to each other in a direction perpendicular to a scan direction of the display panel, an operation of calculating a least common multiple of the first driving frequency and the second driving frequency when the first part and the second part are disposed adjacent to each other in a direction perpendicular to the scan direction of the display panel, an operation of controlling a display driver integrated circuit (DDIC) (e.g., the DDIC 230 of FIG. 2) to drive a first area of the display panel 310 including the first part and the second part of the display panel 310 based on a first partial refresh rate corresponding to the least common multiple, and an operation of controlling the DDIC 230 to drive a second area of the display panel 310 including a third part of the display panel 310 based on a second partial refresh rate corresponding to a third driving frequency.

In the following description, as an example of a state in which the electronic device 101 drives a display into a split screen, it is described that the electronic device 101 executes a plurality of applications and determines a driving frequency driving the entire display area 3100 based on at least a driving frequency for each partial area configured by each of the plurality of applications. However, various embodiments of this document are not limited to examples mentioned below, and a state in which the electronic device 101 drives the display into a split screen may include a state that the electronic device 101 displays an execution screen corresponding to a single application through the entire display area 3100 of the display panel 310, but controls differently driving frequencies for each partial area of the display panel 310 based on an attribute of each area of the execution screen.

In operation 610, the electronic device 101 according to various embodiments may execute a plurality of applications based on a user input.

Referring to FIG. 5B, the electronic device 101 according to an embodiment may execute a first application and a second application.

Referring to FIG. 5C, the electronic device 101 according to another embodiment may execute a first application, a second application, and a third application.

In operations 620 and 630, the electronic device 101 according to various embodiments may determine a driving frequency for displaying execution screens of a plurality of executed applications.

Referring to FIG. 5B, the electronic device 101 according to an embodiment may determine a first driving frequency for displaying a first execution screen A of the first application and a second driving frequency for displaying a second execution screen B of the second application.

Referring to FIG. 5C, the electronic device 101 according to another embodiment may determine a first driving frequency for displaying a first execution screen A of the first application, a second driving frequency for displaying a second execution screen B of the second application, and a third driving frequency for displaying a third execution screen C of the third application.

In operation 640, the electronic device 101 according to various embodiments may calculate the least common multiple of driving frequencies determined for each executed application.

Referring to FIG. 5B, the electronic device 101 according to an embodiment may calculate the least common multiple of a first driving frequency according to a configuration of the first application and a second driving frequency according to a configuration of the second application. For example, the first driving frequency may be 24 Hz and the second driving frequency may be 60 Hz. The electronic device 101 may calculate 120 Hz, which is the least common multiple of 24 Hz and 60 Hz.

Referring to FIG. 5C, the electronic device 101 according to another embodiment may calculate the least common multiple of a first driving frequency according to a configuration of the first application, a second driving frequency according to a configuration of the second application, and a third driving frequency according to a configuration of the third application. For example, the first driving frequency may be 24 Hz, the second driving frequency may be 60 Hz, and the third driving frequency may be 120 Hz. The electronic device 101 may calculate 120 Hz, which is the least common multiple of 24 Hz, 60 Hz, and 120 Hz.

In operation 650, the electronic device 101 according to various embodiments may drive the entire display area 3100 of the display panel 310 based on a full screen refresh rate DR corresponding to the calculated least common multiple.

Referring to FIG. 5B, the electronic device 101 according to an embodiment may determine 120 Hz, which is the calculated least common multiple to the full screen refresh rate DR and drive the entire display area 3100 of the display panel 310 based on the 120 Hz.

Referring to FIG. 5C, the electronic device 101 according to another embodiment may determine 120 Hz, which is the calculated lowest common multiple to the full screen refresh rate DR and drive the entire display area 3100 of the display panel 310 based on the 120 Hz.

In operations 660 and 670, the electronic device 101 according to various embodiments may supply a data signal for displaying an execution screen of a corresponding application to the DDIC 230 at every period corresponding to the driving frequency.

Referring to FIG. 5B, while the electronic device 101 according to an embodiment controls a full screen refresh rate DR driving the entire display area 3100 of the display panel 310 to 120 Hz, which is the least common multiple, the electronic device 101 may supply first data D1 (or first data signal) for displaying the execution screen of the first application to the DDIC 230 at each designated first period. According to an embodiment, the first period may include a value corresponding to the first driving frequency configured by the first application. For example, the first period may be 24 Hz, and the electronic device 101 may supply first data D1 (or first data signal) to the DDIC 230 based on 24 Hz. While the electronic device 101 according to an embodiment controls the full screen refresh rate DR driving the entire display area 3100 of the display panel 310 to 120 Hz, which is the least common multiple, the electronic device 101 may supply second data D2 (or second data signal) for displaying an execution screen of the second application to the DDIC 230 at every designated second period.

According to an embodiment, the second period may include a value corresponding to the second driving frequency configured by the second application. For example, the second period may be 60 Hz, and the electronic device 101 may supply second data D2 (or second data signal) to the DDIC 230 based on 60 Hz.

Referring to FIG. 5C, while the electronic device 101 according to another embodiment controls the full screen refresh rate DR driving the entire display area 3100 of the display panel 310 to 120 Hz, which is the least common multiple, the electronic device 101 may further supply third data D3 (or third data signal) for displaying an execution screen of the third application to the DDIC 230 at each designated third period.

In operations 680 and 690, the electronic device 101 according to various embodiments may control to update execution screens displayed through partial areas of the display panel 310 based on a data signal to which the DDIC 230 is input.

Referring to FIG. 5B, the DDIC 230 according to an embodiment may drive the entire display area 3100 of the display panel 310 at a refresh rate of 120 Hz under the control of the processor 120, but refresh (or update) a first execution screen corresponding to first data D1 (or first data signal) based on 24 Hz, which is a driving frequency of the first application. Accordingly, the first execution screen A may be displayed through the first part 3101 of the display panel 310 and be refreshed (or updated) at each designated first period (e.g., 24 Hz). The DDIC 230 according to an embodiment may drive the entire display area 3100 of the display panel 310 at a refresh rate of 120 Hz under the control of the processor 120, but may refresh (or update) the second execution screen B corresponding to second data D2 (or second data signal) based on 60 Hz, which is the driving frequency of the second application. Accordingly, the second execution screen B may be displayed through the second part 3102 of the display panel 310 and be refreshed (or updated) at a designated second period (e.g., 60 Hz).

Referring to FIG. 5C, the DDIC 230 according to another embodiment may drive the entire display area 3100 of the display panel 310 at a refresh rate of 120 Hz under the control of the processor 120, but may additionally refresh (or update) a third execution screen C corresponding to third data D3 (or third data signal) based on 120 Hz, which is a driving frequency of the third application. Accordingly, the third execution screen C may be displayed through the third part 3103 of the display panel 310 and be refreshed (or updated) at every designated third period (e.g., 120 Hz).

Hereinafter, operations 660 to 690 will be described in detail with reference to FIGS. 5C and 5D. A driving waveform diagram 501 illustrated in FIG. 5D may be an example of input time points of first data D1 supplied to the DDIC 230 by the processor 120 according to a driving frequency of the first application. A driving waveform diagram 502 illustrated in FIG. 5D may be an example of input time points of second data D2 supplied to the DDIC 230 by the processor 120 according to a driving frequency of the second application. A driving waveform diagram 503 illustrated in FIG. 5D may be an example of input time points of third data D3 supplied to the DDIC 230 by the processor 120 according to a driving frequency of the third application.

Referring to FIGS. 5C and 5D, the DDIC 230 may drive the entire display area 3100 of the display panel 310 at a refresh rate of 120 Hz under the control of the processor 120. The refresh rate of 120 Hz may be the least common multiple of 24 Hz, which is a first driving frequency configured by the first application, 60 Hz, which is a second driving frequency configured by the second application, and 120 Hz, which is a third driving frequency configured by the third application. Accordingly, a length of 1 frame period may be determined to about 8.3 ms.

Referring to the driving waveform diagram 503, the processor 120 may supply third data D3 (or third data signal) to the DDIC 230 at every frame of 120 Hz. The DDIC 230 may refresh (or update) the third execution screen C of the third application based on third data D3 (or third data signal) supplied at every frame of 120 Hz.

Referring to the driving waveform diagram 502, the processor 120 may supply second data D2 (or second data signal) to the DDIC 230 at every frame of 60 Hz. The DDIC 230 may refresh (or update) the second execution screen B of the second application based on the second data D2 (or the second data signal) supplied at every frame of 60 Hz. According to an embodiment, the DDIC 230 may self-refresh so that the second part 3102 of the display panel 310 displays the second execution screen B based on the second data D2 input in a previous frame during a frame in which the third data D3 is input from the processor 120 and in which the second data D2 is not input. For example, in a frame k+1, the third data D3 may be input from the processor 120 to the DDIC 230, but the second data D2 may not be input. In this case, the DDIC 230 may perform self-refresh driving that the second part 3102 of the display panel 310 displays the second execution screen B based on the second data D2 input to a k frame with reference to the memory 350.

Referring to the driving waveform diagram 501, the processor 120 may supply first data D1 (or first data signal) to the DDIC 230 at every frame of 24 Hz. The DDIC 230 may refresh (or update) a first execution screen A of the first application based on the first data D1 (or the first data signal) supplied at every frame of 24 Hz. According to an embodiment, the DDIC 230 may self-refresh so that the first part 3101 of the display panel 310 displays the first execution screen A based on the first data D1 input in a previous frame during a frame in which the second data D2 or the third data D3 is input from the processor 120 and in which the first data D1 is not input. For example, in frames k+1 to k+4, the second data D2 and/or the third data D3 may be input from the processor 120 to the DDIC 230, and the first data D1 may not be input. In this case, the DDIC 230 may perform self-refresh driving that displays the first execution screen A based on the first data D1 in which the first part 3101 of the display panel 310 is input into the k frame with reference to the memory 350.

Figure 7:
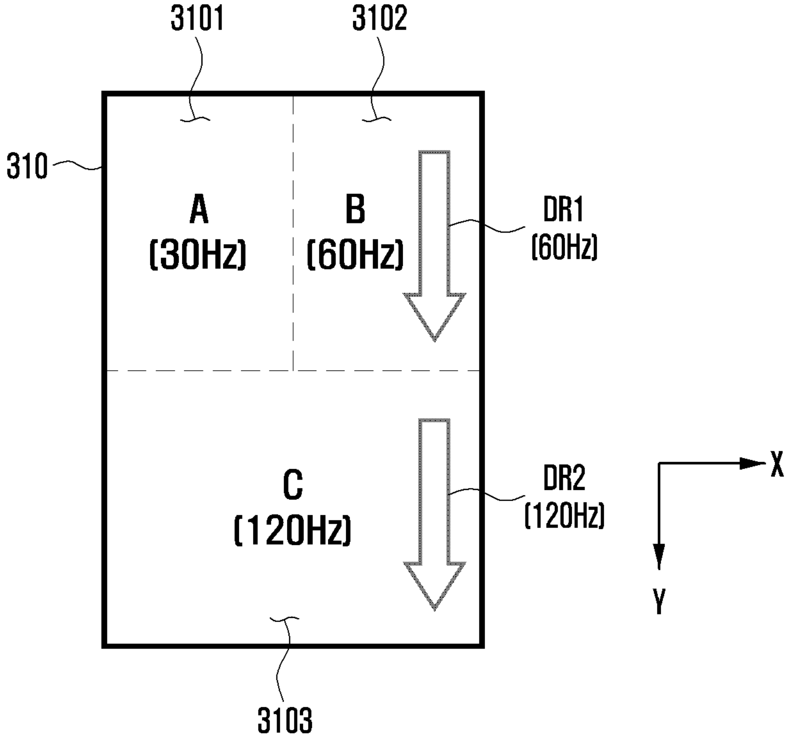
FIG. 7 is a diagram illustrating another example of a driving frequency driving a display panel when an electronic device is in a split screen state according to an embodiment of the disclosure.

FIG. 7 is a diagram illustrating another example of a driving frequency driving a display panel when an electronic device is in a split screen state according to an embodiment of the disclosure.

Figure 8:
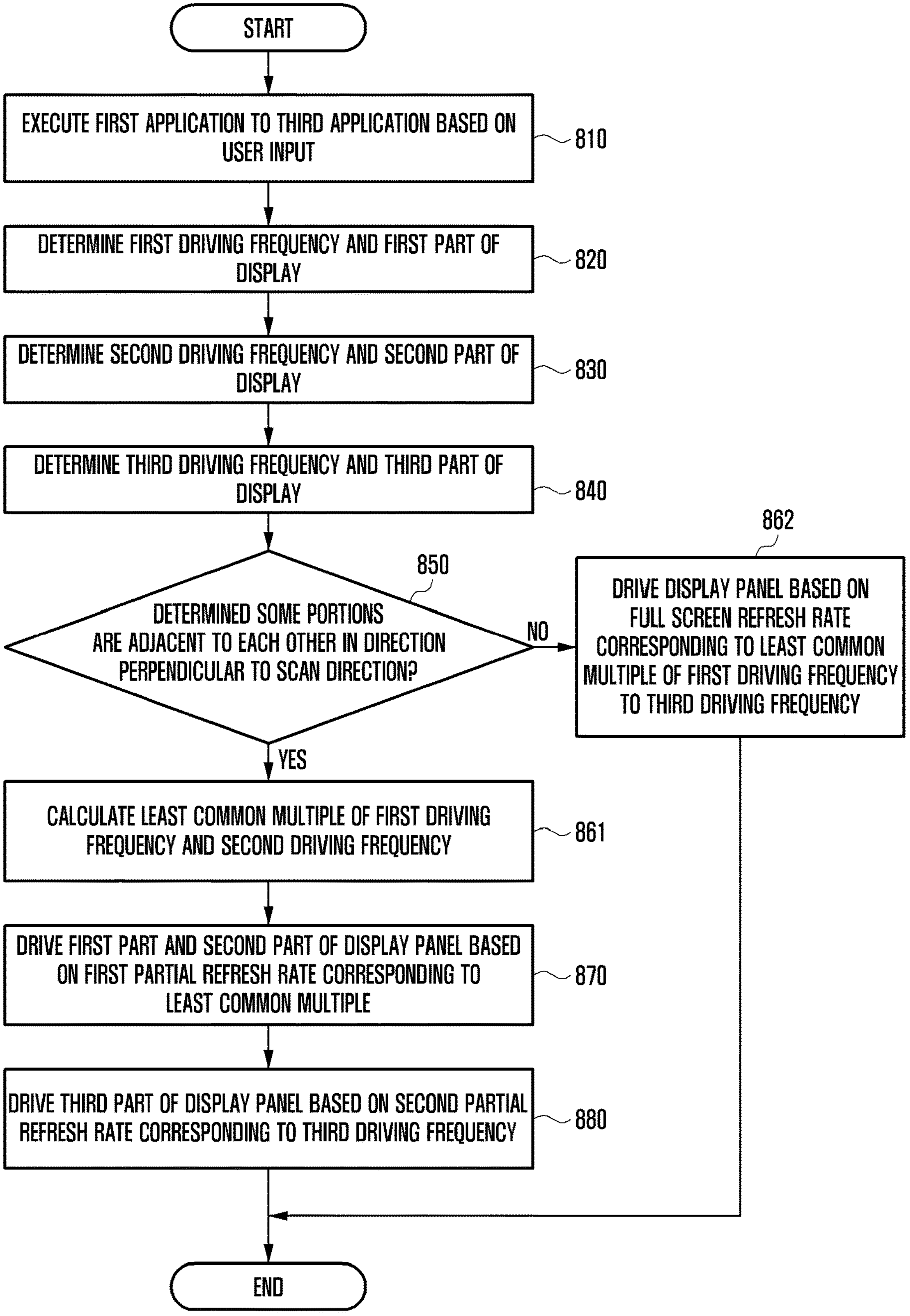
FIG. 8 is a flowchart illustrating an operation of driving a display panel when the electronic device illustrated in FIG. 7 is in a split screen state according to an embodiment of the disclosure.

FIG. 8 is a flowchart illustrating an operation of driving a display panel when an electronic device illustrated in FIG. 7 is in a split screen state according to an embodiment of the disclosure.

At least some of operations illustrated in FIG. 8 may be omitted. Before or after the at least some operations illustrated in FIG. 8, at least some operations mentioned with reference to other drawings (e.g., FIG. 6) in this document may be additionally inserted. Operations illustrated in FIG. 8 may be performed by the processor 120 (e.g., the processor 120 of FIG. 1). For example, the memory (e.g., the memory 130 of FIG. 1) of the electronic device 101 may store instructions that, when executed, allow the processor 120 to perform at least some operations illustrated in FIG. 8.

In operation 810, the electronic device 101 according to an embodiment may execute a first application, a second application, and a third application based on a user input.

In operation 820, the electronic device 101 according to an embodiment may determine a first driving frequency for displaying a first execution screen A of the first application and a first part 3101 of the display panel 310. For example, as illustrated in FIG. 7, the first application may be configured to display the first execution screen A with a first driving frequency (e.g., 30 Hz), and the electronic device 101 may determine a first driving frequency according to a configuration of the first application. The electronic device 101 may determine a first part 3101 on which the first execution screen A is to be displayed in the split screen state.

In operation 830, the electronic device 101 according to an embodiment may determine a second driving frequency for displaying a second execution screen B of the second application and a second part 3102 of the display panel 310. For example, as illustrated in FIG. 7, the second application may be configured to display the second execution screen B with a second driving frequency (e.g., 60 Hz), and the electronic device 101 may determine a second driving frequency according to a configuration of the second application. The electronic device 101 may determine a second part 3102 on which the second execution screen B is to be displayed in the split screen state. In the illustrated example, the first part 3101 and the second part 3102 may be disposed adjacent to each other in a direction (e.g., X direction) perpendicular to the scan direction (e.g., Y direction) of the display panel 310.

In operation 840, the electronic device 101 according to an embodiment may determine a third driving frequency for displaying a third execution screen C of a third application and a third part 3103 of the display panel 310. For example, as illustrated in FIG. 7, the third application may be configured to display the third execution screen C with the third driving frequency (e.g., 120 Hz), and the electronic device 101 may determine the third driving frequency according to a configuration of the third application. The electronic device 101 may determine the third part 3103 on which the third execution screen C is to be displayed in the split screen state. In the illustrated example, the third part 3103 and the first part 3101 (or the second part 3102) may be disposed adjacent to each other in a scan direction (e.g., Y direction) of the display panel 310.

In operation 850, the electronic device 101 according to an embodiment may determine whether the determined partial portions are divided into at least two areas along the scan direction (e.g., the Y direction of FIG. 7) and some portions adjacent to each other exist in a direction (e.g., the X direction of FIG. 7) perpendicular to the scan direction (e.g., the Y direction of FIG. 7). For example, as illustrated in FIG. 7, the electronic device 101 may determine that the first part 3101 and the second part 3102 are adjacent to each other in a direction (e.g., the Y direction of FIG. 7) perpendicular to the scan direction (e.g., the Y direction of FIG. 7).

In operation 850, in the case (e.g., the result of operation 850 is Yes) that the determined some parts are adjacent to each other in a direction (e.g., the X direction of FIG. 7) perpendicular to the scan direction (e.g., the Y direction of FIG. 7), the electronic device 101 according to an embodiment may perform operation 861.

In operation 850, in the case (e.g., the result of operation 850 is No) that the determined some parts are not adjacent to each other in a direction (e.g., the X direction of FIG. 7) perpendicular to the scan direction (e.g., the Y direction of FIG. 7), the electronic device 101 according to an embodiment may perform operation 862.

In operation 861, in the case (e.g., the result of operation 850 is Yes) that the determined some parts are adjacent to each other in a direction (e.g., the X direction of FIG. 7) perpendicular to the scan direction (e.g., the Y direction of FIG. 7), the electronic device 101 according to an embodiment may calculate the least common multiple of the first driving frequency (e.g., 30 Hz) and the second driving frequency (e.g., 60 Hz). For example, as illustrated in FIG. 7, the first driving frequency may be 30 Hz, and the second driving frequency may be 60 Hz. The electronic device 101 may calculate 60 Hz, which is the least common multiple of 30 Hz and 60 Hz.

In operation 862, in the case (e.g., the result of operation 850 is No) that the determined some parts are not adjacent to each other in a direction (e.g., the X direction of FIG. 7) perpendicular to the scan direction (e.g., the Y direction of FIG. 7), the electronic device 101 according to an embodiment may drive the entire display area 3100 of the display panel 310 based on the full screen refresh rate DR corresponding to the least common multiple of the first driving frequency, the second driving frequency, and the third driving frequency. For example, operation 862 may be at least partially similar to or substantially the same as operations 650 to 690 illustrated in FIG. 6.

In operation 870, the electronic device 101 according to an embodiment may drive the first part 3101 and the second part 3102 of the display panel 310 based on the first partial refresh rate DR1 corresponding to the least common multiple calculated in operation 861. For example, as illustrated in FIG. 7, the calculated least common multiple may be 60 Hz, and the electronic device 101 may drive the first part 3101 and the second part 3102 based on 60 Hz.

In another embodiment, an operation of driving the first part 3101 and the second part 3102 based on 60 Hz may include an operation of supplying scan signals and light emitting signals at 60 Hz to some gate lines GL (e.g., the gate lines GL of FIG. 3) of the display panel 310 disposed to correspond to the first part 3101 and the second part 3102.

In another embodiment, an operation of driving the first part 3101 and the second part 3102 based on 60 Hz may include an operation of refreshing (or updating) a first execution screen A corresponding to first data D1 (or first data signal) based on 30 Hz, which is a driving frequency of the first application and an operation of refreshing (or updating) a second execution screen B corresponding to second data D2 (or second data D2) based on 60 Hz, which is a driving frequency of the second application.

In operation 880, the electronic device 101 according to an embodiment may drive the third part 3103 of the display panel 310 based on a second partial refresh rate DR2 corresponding to the third driving frequency. For example, as illustrated in FIG. 7, the third driving frequency may be 120 Hz, and the electronic device 101 may drive the third part 3103 based on 120 Hz.

In another embodiment, an operation of driving the third part 3103 based on 120 Hz may include an operation of supplying a scan signal and a light emitting signal at 120 Hz to some gate lines GL (e.g., the gate lines GL of FIG. 3) of the display panel 310 disposed to correspond to the third part 3103.

In another embodiment, an operation of driving the third part 3103 based on 120 Hz may include an operation of refreshing (or updating) the third execution screen C corresponding to third data D3 (or third data signal) based on 120 Hz, which is the driving frequency of the third application.

Figure 9:
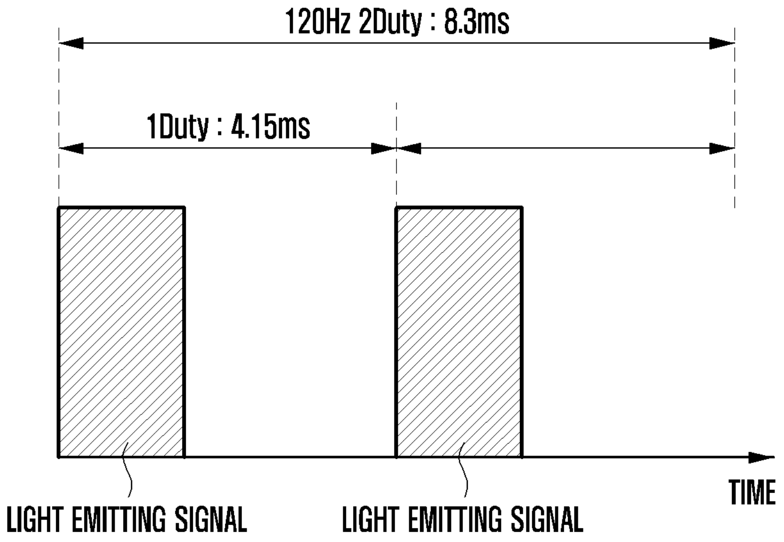
FIG. 9 is a diagram illustrating a driving method of adjusting a duty of a light emitting signal of a display panel according to an embodiment of the disclosure.

FIG. 9 is a diagram illustrating a driving method of adjusting a duty of a light emitting signal of a display panel according to an embodiment of the disclosure.

According to various embodiments, the electronic device 101 may configure a duty (or cycle) of light emitting signals output to each frame to the plural in a split screen state. For example, as illustrated in FIG. 9, the electronic device 101 may, drive the display panel 310 at 120 Hz 2 duty. In this case, 1 frame period may be about 8.3 ms corresponding to 120 Hz, and a duty length of one light emitting signal may be about 4.15 ms.

Referring to FIG. 9, in the case that a duty (or cycle) of light emitting signals output to each frame may be configured to the plural, the electronic device 101 according to various embodiments may determine a driving frequency of each of partial areas to an integer multiple of a duty of a light emitting signal. For example, in the case that the maximum driving frequency that may be supported by the display panel 310 is 120 Hz 2 duty, driving frequencies that may be supported in each of partial areas may be 2 duty (120 Hz), 3 duty (80 Hz), 4 duty (60 Hz), 5 duty (48 Hz), 6 duty (40 Hz), or 8 duty (30 Hz).

In the case that the maximum driving frequency supportable by the display panel 310 is 120 Hz 2 duty, the electronic device 101 according to various embodiments may drive a partial area in which a driving frequency configured by a specific application is 55 Hz based on 4 duties (60 Hz) corresponding to a duty multiple closest to 55 Hz.

Figure 10:
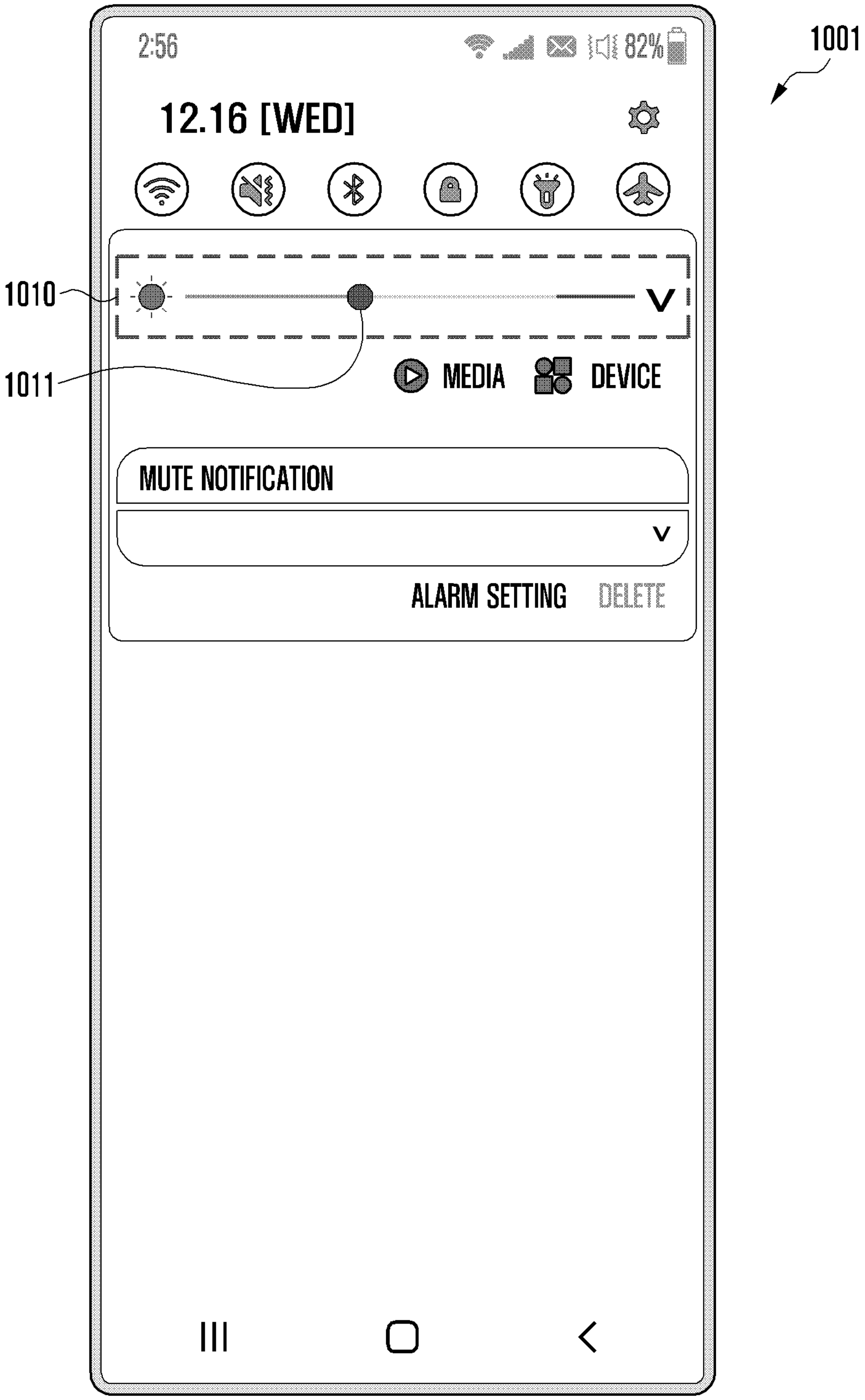
FIG. 10 is a diagram illustrating a UI of an electronic device for adjusting luminance of a display panel according to an embodiment of the disclosure.

FIG. 10 is a diagram illustrating a UI of an electronic device for adjusting luminance of a display panel according to an embodiment of the disclosure.

Referring to FIG. 10, the electronic device 101 may provide a UI thereof for adjusting luminance of the display panel 310. According to an embodiment, the electronic device 101 may receive a designated user gesture input and display a function execution menu 1001 in response to the user gesture input. According to an embodiment, the function execution menu 1001 may include an adjustment bar 1010 for adjusting luminance of the display panel 310. According to an embodiment, the electronic device 101 may adjust luminance of the display panel 310 based on a user input for moving the handler 1011 of the adjustment bar 1010. For example, by performing a touch input that moves a handler 1011 of the adjustment bar 1010, the user may adjust luminance of the display panel 310 brightly or darkly.

The electronic device 101 according to various embodiments may vary a duty (or cycle) of a light emitting signal based on luminance of the display panel 310 in a split screen state. For example, in the case of a high luminance state in which luminance of the display panel 310 is greater than or equal to reference luminance, the electronic device 101 may control a light emitting signal to 1 duty. In the case of a low luminance state in which luminance of the display panel 310 is lower than reference luminance, the electronic device 101 may configure a duty (or cycle) of the light emitting signal to the plural.

Referring to Table 1, the electronic device 101 according to an embodiment may control a light emitting signal to 1 duty in a high luminance state in which luminance of the display panel 310 is about 100 nit to about 1000 nit.

In a low luminance state in which luminance of the display panel 310 is about 1 nit to about 100 nit, the electronic device 101 according to an embodiment may control the light emitting signal to an integer multiple of the duty.

TABLE 1

| | High luminance | Low luminance |
|---|---|---|
| Luminance | 100 nit-1000 nit | 1 nit-100 nit |
| Duty (@60 Hz) | 1 duty | Integer multiple of duty |
| Driving frequency that may be supported for each partial area | 1 Hz-120 Hz | 2 duty (120 Hz), 3 duty (80 Hz), 4 duty (60 Hz), 5 duty (48 Hz), 6 duty (40 Hz), or 8 duty (30 Hz), and the like |

Figure 11:
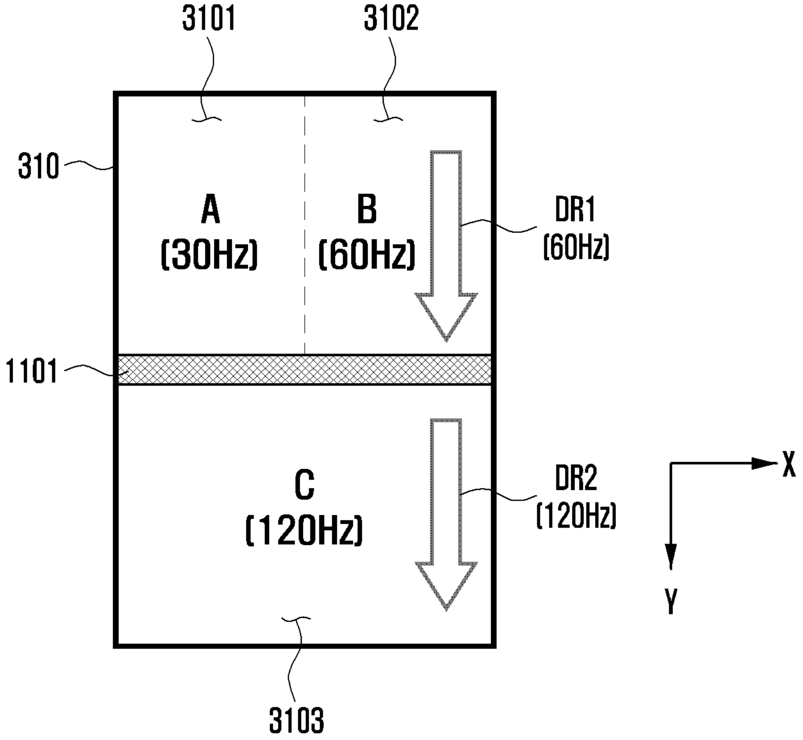
FIG. 11 is a diagram illustrating an operation of inserting a black line into a boundary where a driving frequency of a display panel is changed by an electronic device according to an embodiment of the disclosure.

FIG. 11 is a diagram illustrating an operation of inserting a black line into a boundary where a driving frequency of a display panel is changed by an electronic device according to an embodiment of the disclosure.

Referring to FIG. 11, the electronic device 101 according to an embodiment may execute a first application, a second application, and a third application and operate in a split screen state. For example, the electronic device 101 may determine a first part 3101 of the display panel 310 on which a first execution screen A of the first application is displayed, a second part 3102 of the display panel 310 on which a second execution screen B of the second application is displayed, and a third part 3103 of the display panel 310 on which a third execution screen C of the third application is displayed. According to an embodiment, the first part 3101 and the second part 3102 may be disposed adjacent to each other in a direction (e.g., X direction) perpendicular to the scan direction (e.g., Y direction) of the display panel 310. According to an embodiment, the third part 3103 and the first part 3101 (or the second part 3102) may be disposed adjacent to each other in a scan direction (e.g., Y direction) of the display panel 310.

According to an embodiment, the electronic device 101 may calculate the least common multiple of a first driving frequency according to a configuration of the first application and a second driving frequency according to a configuration of the second application and drive some gate lines GL (e.g., the gate lines GL of FIG. 3) in which the first part 3101 and the second part 3102 are disposed based on the first partial refresh rate DR1 of 60 Hz corresponding to the calculated least common multiple. For example, the electronic device 101 may drive a first gate line GL (not illustrated) to a j-1st gate line GL disposed to correspond to the first part 3101 and the second part 3102 at 60 Hz.

According to an embodiment, the electronic device 101 may determine the second partial refresh rate DR2 corresponding to the third driving frequency according to a configuration of the third application to 120 Hz and drive some gate lines GL (e.g., the gate lines GL of FIG. 3) disposed at the third part 3103 based on the second partial refresh rate DR2 of 120 Hz. For example, the electronic device 101 may drive a j-th gate line GL to an n-th gate line GL (the last gate line GL) disposed to correspond to the third part 3103 at 120 Hz.

According to an embodiment, the electronic device 101 may control to display the black line 1101 in the first part 3101 and the second part 3102 driven at the first partial refresh rate DR1 and at a boundary of the second part 3102 driven at the second partial refresh rate DR2. For example, the black line 1101 may be configured to display a black gray level and be disposed in a direction (e.g., X direction) perpendicular to the scan direction (e.g., Y direction) of the display panel 310 to correspond to the boundary.

According to an embodiment, in order to display the black line 1101, the electronic device 101 may supply a data signal corresponding to a black gray level to some pixels P connected to some gate lines GL including the j-th gate line GL.

The electronic device 101 according to various embodiments may insert the black line 1101 into the boundary where a refresh rate is changed, thereby reducing visibility of a color deviation that may occur in each partial area.

Figure 12:
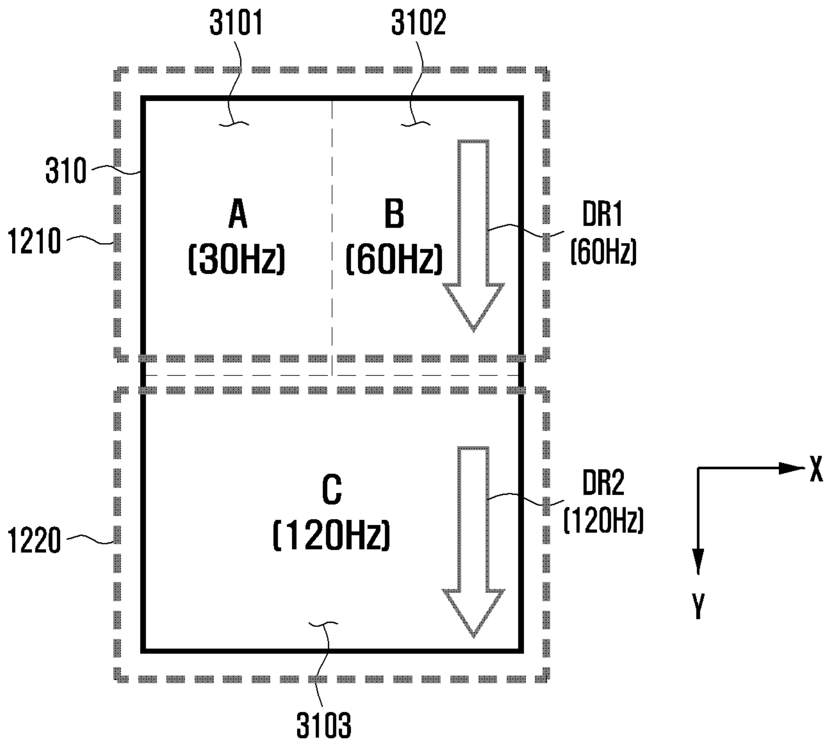
FIG. 12 is a diagram illustrating a first area and a second area divided according to a partial refresh rate of a display panel according to an embodiment of the disclosure.

FIG. 12 is a diagram illustrating a first area and a second area divided according to a partial refresh rate of a display panel according to an embodiment of the disclosure.

Figure 13:
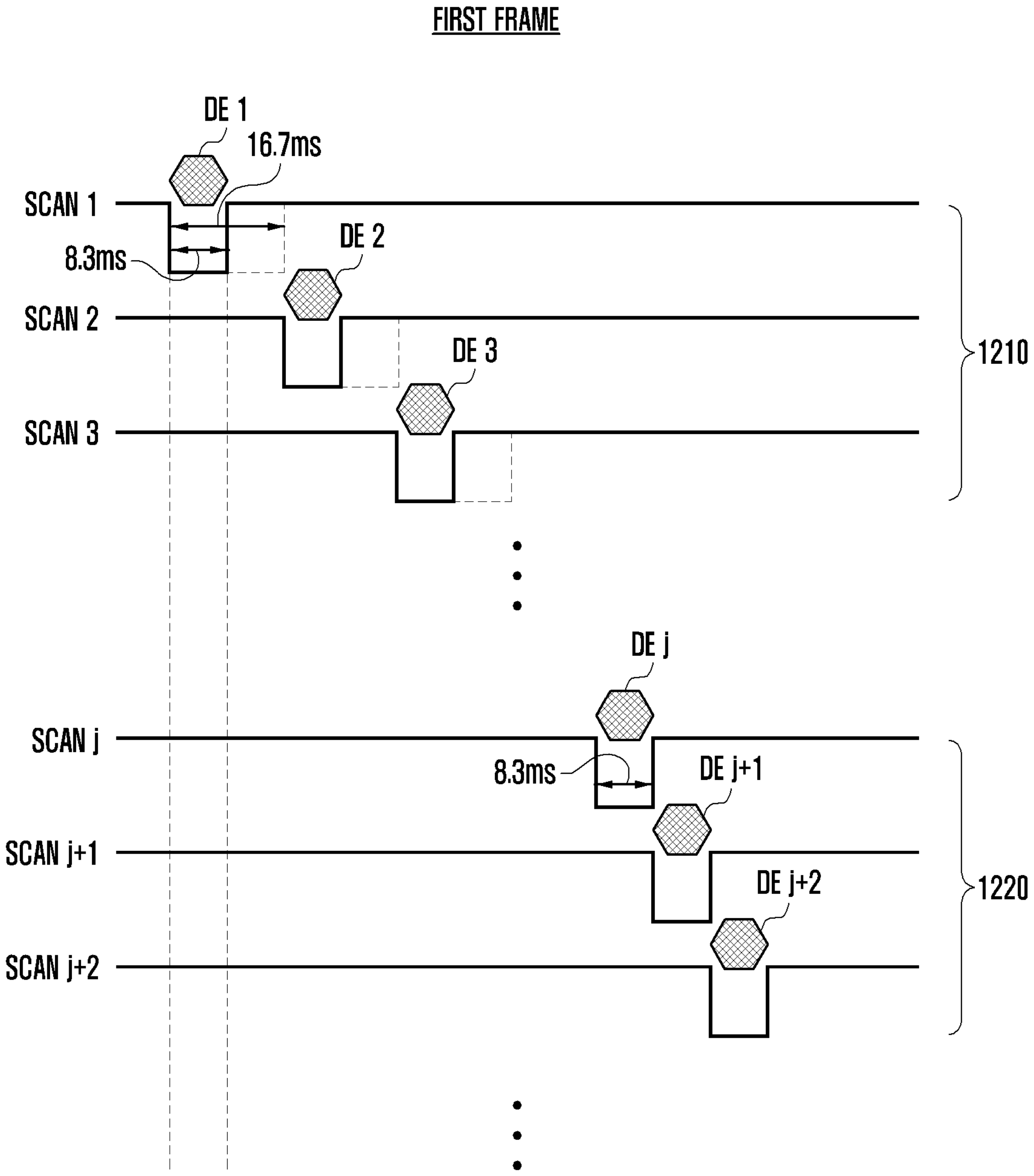
FIG. 13 is a diagram illustrating a scan signal and a data enable signal applied during a first frame period to a first area and a second area of the display panel illustrated in FIG. 12 according to an embodiment of the disclosure.

FIG. 13 is a diagram illustrating a scan signal and a data enable signal applied during a first frame period to a first area and a second area of the display panel illustrated in FIG. 12 according to an embodiment of the disclosure.

Figure 14:
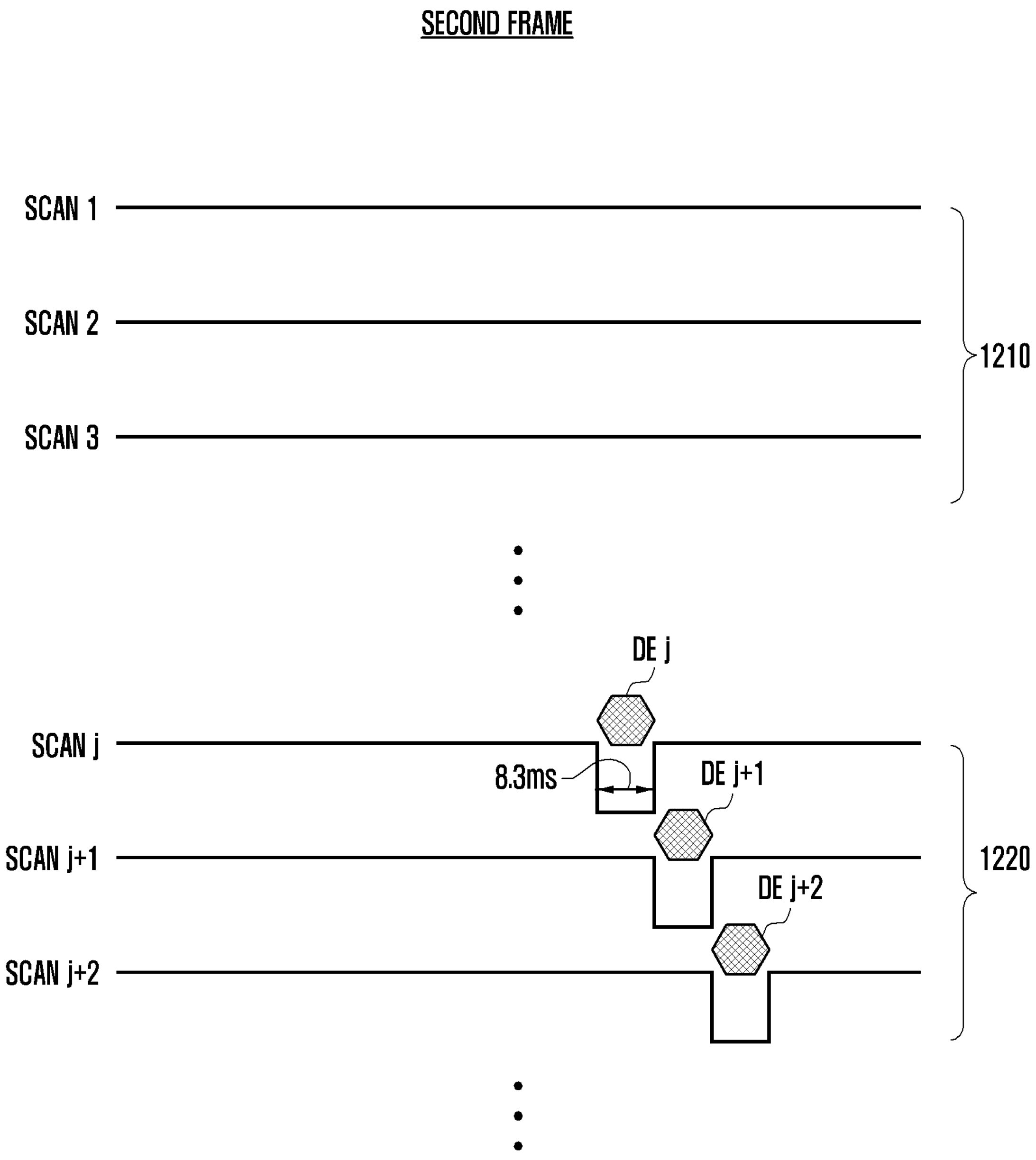
FIG. 14 is a diagram illustrating a scan signal and a data enable signal applied during a second frame period to a first area and a second area of the display panel illustrated in FIG. 12 according to an embodiment of the disclosure.

FIG. 14 is a diagram illustrating a scan signal and a data enable signal applied during a second frame period to a first area and a second area of a display panel illustrated in FIG. 12 according to an embodiment of the disclosure.

Referring to FIGS. 12 to 14, the electronic device 101 according to an embodiment may drive the first area 1210 of the display panel 310 including the first part 3101 and the second part 3102 based on a first part refresh rate DR1 of 60 Hz in a split screen state. For example, the electronic device 101 may drive a first gate line GL (not illustrated) to a j-1st gate line GL (not illustrated) disposed to correspond to the first area 1210 of the display panel 310 at 60 Hz. The electronic device 101 according to an embodiment may drive the second area 1220 of the display panel 310 including the third part 3103 based on the second partial refresh rate DR2 of 120 Hz. For example, the electronic device 101 may drive a j-th gate line GL to an n-th gate line GL (the last gate line GL) disposed to correspond to the second area 1220 of the display panel 310 at 120 Hz.

According to an embodiment, the electronic device 101 may equally control a length of a turn-on period (e.g., scan on time (SOT)) of scan signals applied to gate lines GL (e.g., the gate lines GL of FIG. 3) disposed in the first area 1210 and a length of a turn-on period (e.g., SOT) of scan signals SCAN applied to gate lines GL (e.g., the gate lines GL of FIG. 3) disposed in the second area 1220. In general, when the refresh rate of the display panel 310 is 60 Hz, one scan signal SCAN may have a turn-on period (e.g., SOT) of about 16.7 ms, and when the refresh rate of the display panel 310 is 120 Hz, one scan signal SCAN may have a turn-on period (e.g., SOT) of about 8.3 ms.

According to an embodiment, the electronic device 101 may drive the first area 1210 at 60 Hz, which is the first partial refresh rate DR1, and drive the second area 1220 at 120 Hz, which is the second partial refresh rate DR2, but configure a length of the scan signal SCAN applied to each of the first area 1210 and the second area 1220 to about 8.3 ms. For example, in the case that a turn-on period (e.g., SOT) of the scan signal SCAN according to the second partial refresh rate DR2 is shorter than a turn-on period (e.g., SOT) of the scan signal SCAN according to the first partial refresh rate DR1, the electronic device 101 may configure the turn-on period (e.g., SOT) of the scan signal SCAN applied to each of the first area 1210 and the second area 1220 to the turn-on period (e.g., SOT) of the scan signal SCAN according to the second partial refresh rate DR2.

According to an embodiment, as illustrated in FIG. 13, the electronic device 101 may sequentially apply scan signals SCAN to all gate lines GL (e.g., the gate lines GL of FIG. 3) during the first frame, but configure the turn-on period (e.g., SOT) of each scan signal SCAN to the turn-on period (e.g., SOT) of the scan signal SCAN according to the second partial refresh rate DR2. According to an embodiment, by applying data signals (e.g., analog video data) to pixels P disposed in each of the first area 1210 and the second area 1220 in synchronization with the scan signal SCAN during the first frame, the electronic device 101 may refresh (or update) a first execution screen A and a second execution screen B displayed through each of the first area 1210 and the second area 1220.

According to an embodiment, as illustrated in FIG. 14, the electronic device 101 may not apply the scan signal SCAN only to some gate lines GL (e.g., the gate line of FIG. 3 (GL)) positioned in the first area 1210 during the second frame, but may sequentially apply the scan signal SCAN to some gate lines GL (e.g., the gate lines GL of FIG. 3) positioned in the second area 1220. According to an embodiment, the turn-on period (e.g., SOT) of each scan signal SCAN may be configured to the turn-on period (e.g., SOT) of the scan signal SCAN according to the second partial refresh rate DR2.

According to an embodiment, by applying data signals (e.g., analog image data) to pixels P disposed in the second area 1220 in synchronization with the scan signal SCAN during the second frame, the electronic device 101 may refresh (or update) the second execution screen B displayed through the second area 1220. The DDIC 230 of the electronic device 101 may maintain (e.g., self-refresh) a previous screen of the first execution screen A displayed through the first area 1210 during the second frame under the control of the processor 120.

According to an embodiment, the DDIC 230 of the electronic device 101 may supply data signals (e.g., analog image data) supplied to pixels P of 1 row to data lines DL (e.g., the data lines DL of FIG. 3) in response to a data enable (DE) signal that is input in synchronization with the scan signal SCAN. According to an embodiment, the DE signal DE may be a synchronization signal supplied from the processor 120 to the DDIC 230. According to an embodiment, a period during which the data enable signal is turned on may be a writing time (or programming time) during which data signals are written to pixels P of 1 row. According to an embodiment, the electronic device 101 may equally control all turn-on periods (e.g., SOT) of scan signals SCAN applied to each of the first area 1210 and the second area 1220 and equally control a length (e.g., the turn-on period of the DE signal DE) of a writing time during which the data signal is written in pixels P of 1 row to the turn-on period (e.g., SOT) of the scan signal SCAN. For example, a length of a writing time (e.g., the turn-on period of the DE signal DE) in which the data signal is written in pixels P of 1 row may be controlled to about 8.3 ms.

The electronic device 101 according to various embodiments may equally, control the turn-on period (e.g., SOT) of the scan signal SCAN applied to each of the first area 1210 and the second area 1220 and control a length of a writing time (e.g., the turn-on period of the DE signal DE) during which the data signal is written in pixels P of 1 row to be the same as the turn-on period (e.g., SOT) of the scan signal SCAN, thereby reducing an optical characteristic deviation due to a difference in turn-on period (e.g., SOT) of the scan signal SCAN for each area having different driving frequencies.

Figure 15:
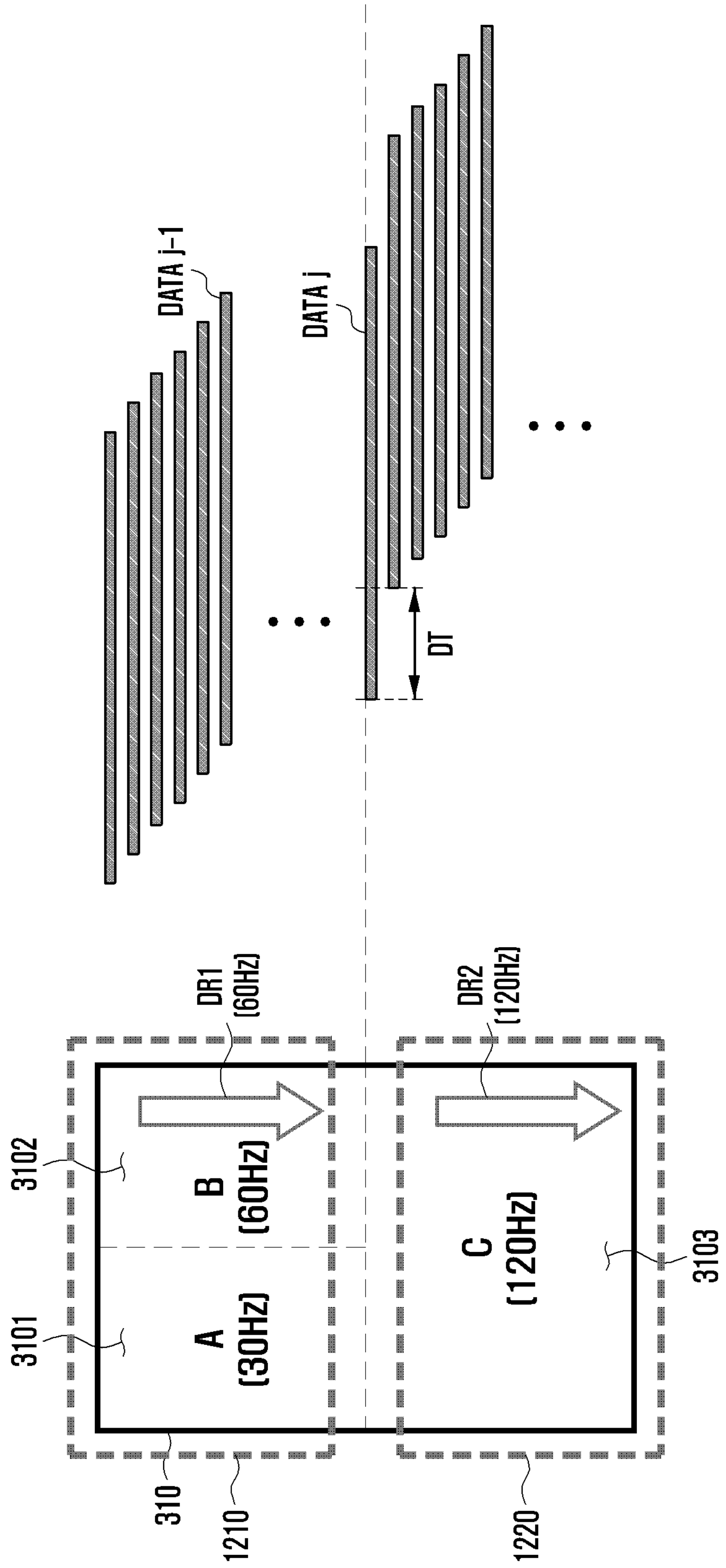
FIG. 15 is a diagram illustrating an operation of inserting a delay time into a boundary where a driving frequency of a display panel is changed by an electronic device according to an embodiment of the disclosure.

FIG. 15 is a diagram illustrating an operation of inserting a delay time into a boundary where a driving frequency of a display panel is changed by an electronic device according to an embodiment of the disclosure.

Referring to FIG. 15, the electronic device 101 according to an embodiment may drive the first area 1210 of the display panel 310 including a first part 3101 and a second part 3102 based on a first partial refresh rate DR1 of 60 Hz in a split screen state. For example, the electronic device 101 may drive a first gate line GL (not illustrated) to a j-1st gate line GL (not illustrated) disposed to correspond to the first area 1210 of the display panel 310 at 60 Hz. The electronic device 101 according to an embodiment may drive the second area 1220 of the display panel 310 including the third part 3103 based on the second partial refresh rate DR2 of 120 Hz. For example, the electronic device 101 may drive a j-th gate line GL to an n-th gate line GL (the last gate line GL) disposed to correspond to the second area 1220 of the display panel 310 at 120 Hz.

The electronic device 101 according to various embodiments may, configure a delay time DT at a boundary between the first area 1210 and the second area 1220 where the refresh rate is changed. According to an embodiment, the electronic device 101 may sequentially apply data signals (e.g., analog image data) to pixels P positioned in the first area 1210, and configure a delay time DT at the boundary. According to an embodiment, the electronic device 101 may sequentially apply data signals to the pixels P positioned in the second area 1220 after the delay time DT has elapsed. For example, the electronic device 101 may apply data signals to pixels P disposed in a j-1 row, which is the last row of the first area 1210 and then configure the delay time DT. After the delay time DT has elapsed, the electronic device 101 may sequentially apply data signals from pixels P disposed in a j row, which is a first row of the second area 1220 to pixels P disposed in an n row, which is the last row of the second area 1220.

Figure 16:
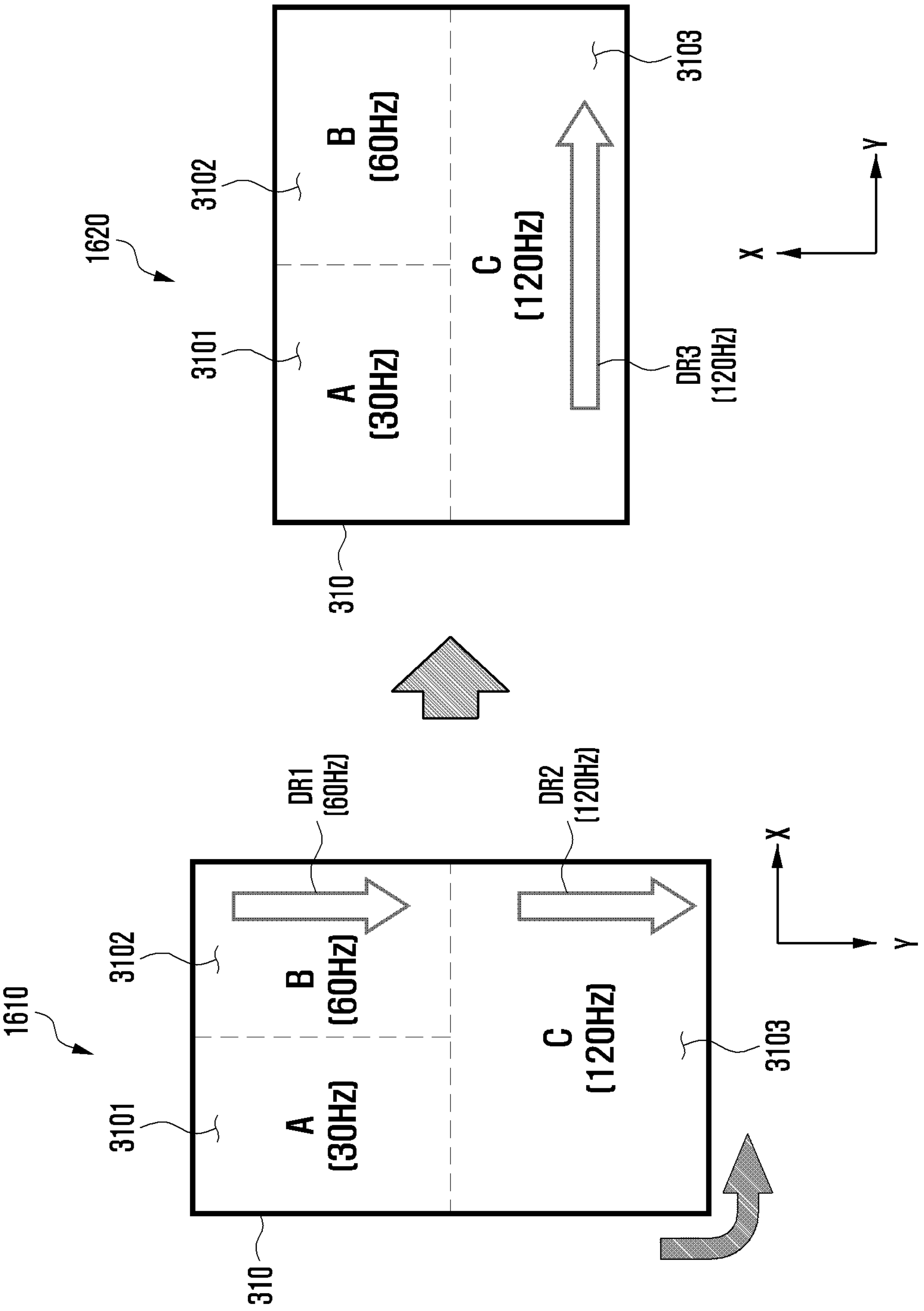
FIG. 16 is a diagram illustrating an operation of an electronic device according to an event in which a direction or posture of the electronic device is changed according to an embodiment of the disclosure.

FIG. 16 is a diagram illustrating an operation of an electronic device according to an event in which a direction or posture of the electronic device is changed according to an embodiment of the disclosure.

Figure 17:
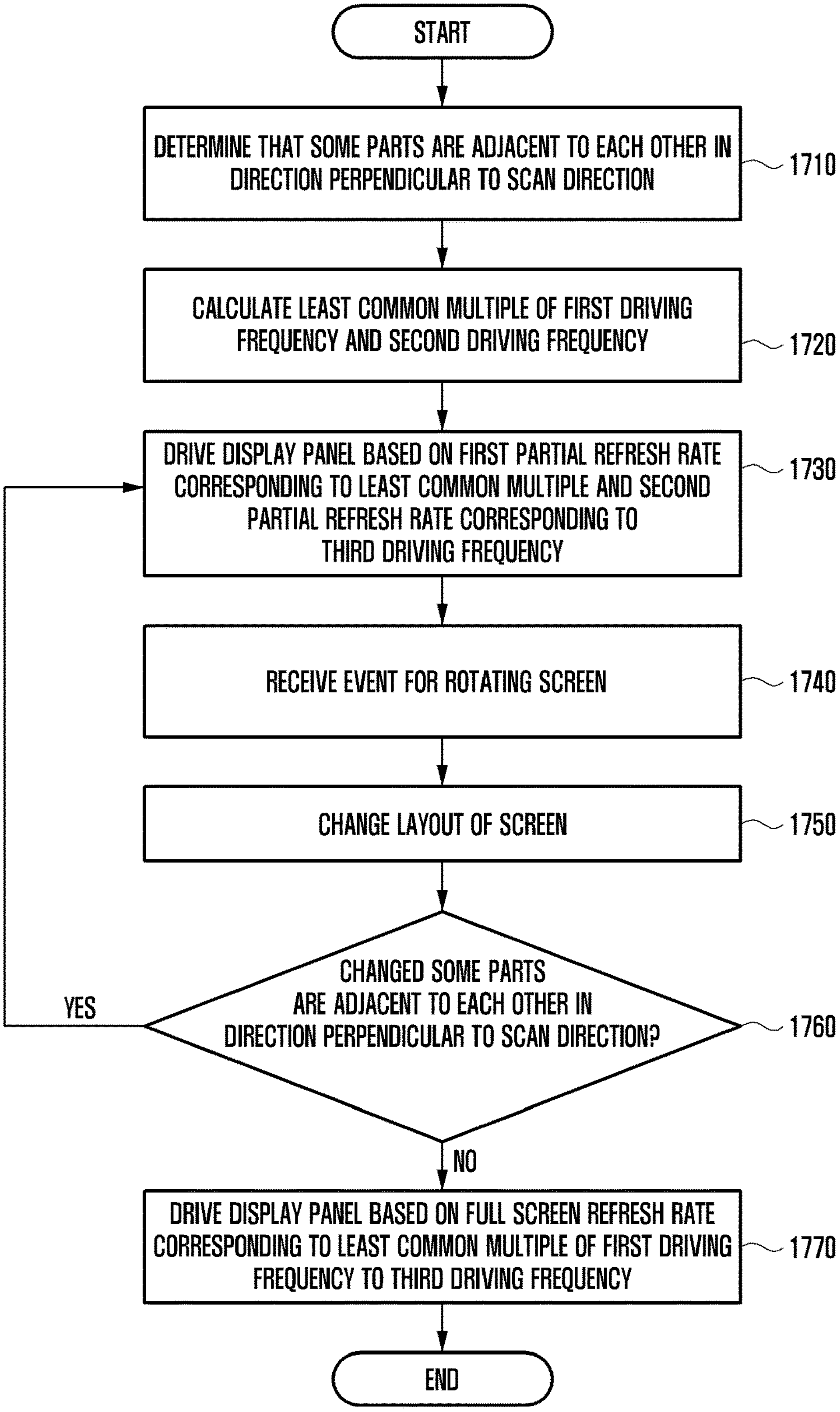
FIG. 17 is a flowchart illustrating an operation of the electronic device illustrated in FIG. 16 according to an embodiment of the disclosure.

FIG. 17 is a flowchart illustrating an operation of an electronic device illustrated in FIG. 16 according to an embodiment of the disclosure.

At least some of operations illustrated in FIG. 17 may be omitted. Before or after at least some operations illustrated in FIG. 17, at least some operations mentioned with reference to other drawings (e.g., FIG. 6 or 8) in this document may be additionally inserted. The operations illustrated in FIG. 17 may be performed by the processor 120 (e.g., the processor 120 of FIG. 1). For example, the memory 350 (e.g., the memory 130 of FIG. 1) of the electronic device 101 may store instructions that, when executed, allow the processor 120 to perform at least some operations illustrated in FIG. 17.

Hereinafter, an operation of the electronic device 101 according to an event in which a direction or posture of the electronic device 101 is changed will be described with reference to FIGS. 16 and 17.

In operation 1710, the electronic device 101 according to an embodiment may determine that some parts are divided into at least two areas along a scan direction (e.g., the Y direction of FIG. 16) in a split screen state and that some parts adjacent to each other exist in a direction (e.g., the X direction of FIG. 16) perpendicular to the scan direction (e.g., the Y direction of FIG. 16). For example, in state 1610 of FIG. 16, the electronic device 101 according to an embodiment may determine that the entire display area 3100 of the display panel 310 is divided into a first area (e.g., the first area 1210 of FIG. 12) including the first part 3101 and the second part 3102 along the scan direction (e.g., the Y direction of FIG. 16) and a second area (e.g., the second area 1220 of FIG. 12) including the third part 3103. For example, in state 1610 of FIG. 16, the electronic device 101 according to an embodiment may determine that the first part 3101 and the second part 3102 are disposed adjacent to each other in a direction (e.g., the X direction of FIG. 16) perpendicular to the scan direction (e.g., the Y direction of FIG. 16).

In operation 1720, the electronic device 101 according to an embodiment may calculate the least common multiple of the first driving frequency (e.g., 30 Hz) and the second driving frequency (e.g., 60 Hz). For example, as illustrated in FIG. 7, the first driving frequency may be 30 Hz, and the second driving frequency may be 60 Hz. The electronic device 101 may calculate 60 Hz, which is the least common multiple of 30 Hz and 60 Hz. Operation 1720 may be at least partially similar to or substantially the same as operation 861 illustrated in FIG. 8.

In operation 1730, the electronic device 101 according to an embodiment may drive the first area 1210 including the first part 3101 and the second part 3102 of the display panel 310 based on the first partial refresh rate DR1 corresponding to the calculated least common multiple and drive the second area 1220 including the third part 3103 of the display panel 310 based on the second partial refresh rate DR2 corresponding to the third driving frequency. Operation 1730 may be at least partially similar to or substantially the same as operations 870 to 880 illustrated in FIG. 8.

In operation 1740, the electronic device 101 according to an embodiment may receive an event 1601 for rotating the screen. According to an embodiment, the event may include an event of receiving a touch input through a display, an event of detecting a rotation of a posture or direction of the electronic device 101, or an event of receiving an input through a designated physical button. For example, the electronic device 101 may receive the event in state 1610 of FIG. 16.

In operation 1750, the electronic device 101 according to an embodiment may change a layout in which the first part 3101, the second part 3102, and the third part 3103 are displayed in response to the event. For example, the electronic device 101 may change a layout of the screen displayed through the display panel 310 from state 1610 illustrated in FIG. 16 to state 1620 in response to the event. Referring to state 1620, in the changed layout, the third part 3103 is continuously connected without being segmented along the scan direction (e.g., the Y direction of FIG. 16); thus, the entire display area 3100 of the display panel 310 may not be divided into at least two areas along the scan direction (e.g., the Y direction of FIG. 16).

In operation 1760, the electronic device 101 according to an embodiment may determine whether some parts of the changed layout are divided into at least two areas along the scan direction (e.g., the Y direction of FIG. 16) and some parts adjacent to each other exist in a direction (e.g., the X direction of FIG. 16) perpendicular to the scan direction (e.g., the Y direction of FIG. 16). For example, in the illustrated example, because the third part 3103 is continuously connected without being segmented along the scan direction (e.g., the Y direction of FIG. 16), the electronic device 101 according to state 1620 may determine that the result of operation 1760 is No.

In operation 1760, in the case the result of operation 1760 is Yes) that some parts of the changed layout are divided into at least two areas along the scan direction (e.g., the Y direction of FIG. 16) and that some parts adjacent to each other exist in a direction (e.g., the X direction of FIG. 16) perpendicular to the scan direction (e.g., the Y direction of FIG. 16), the electronic device 101 according to an embodiment may perform operation 1730.

In operation 1760, in the case (e.g., the result of operation 1760 is No) that some parts of the changed layout are not divided into at least two areas along the scan direction (e.g., the Y direction of FIG. 16) or that some parts adjacent to each other do not exist in a direction (e.g., X direction of FIG. 16) perpendicular to the scan direction (e.g., the Y direction of FIG. 16), the electronic device 101 according to an embodiment may perform operation 1770.

In operation 1770, the electronic device 101 according to an embodiment may drive the entire display area 3100 of the display panel 310 based on the full screen refresh rate DR corresponding to the least common multiple of the first driving frequency, the second driving frequency, and the third driving frequency. For example, operation 1710 may be at least partially similar to or substantially the same as operations 650 to 690 illustrated in FIG. 6 or operation 862 illustrated in FIG. 8.

Figure 18:
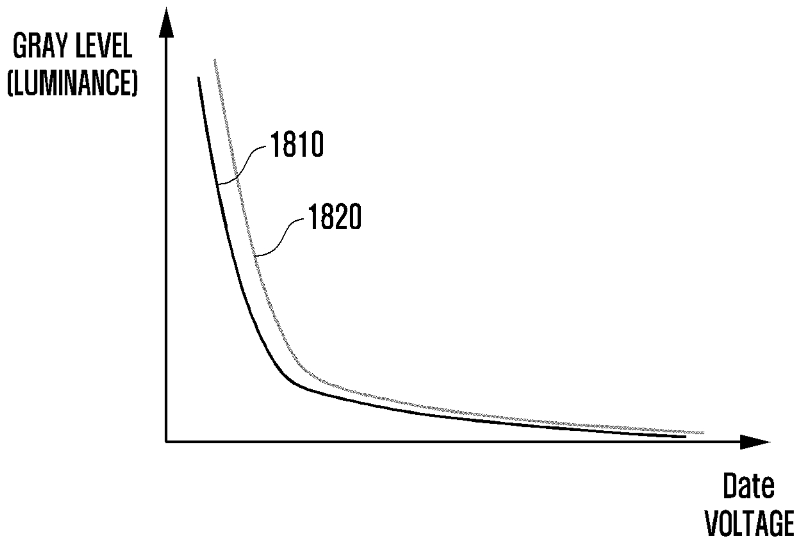
FIG. 18 is a graph illustrating a luminance curve (or gray level curve) according to a data voltage according to an embodiment of the disclosure.

FIG. 18 is a graph illustrating a luminance curve (or gray level curve) according to a data voltage according to an embodiment of the disclosure.

Referring to FIG. 18, the electronic device 101 according to various embodiments may drive a first area 1210 of the display panel 310 including a first part 3101 and a second part 3102 based on a first partial refresh rate DR1 of 60 Hz in a split screen state. For example, the electronic device 101 may drive a first gate line GL (not illustrated) to a j-1st gate line GL (not illustrated) disposed to correspond to the first area 1210 of the display panel 310 at 60 Hz. The electronic device 101 according to an embodiment may drive the second area 1220 of the display panel 310 including the third part 3103 based on the second partial refresh rate DR2 of 120 Hz. For example, the electronic device 101 may drive a j-th gate line GL to an n-th gate line GL (the last gate line GL) disposed to correspond to the second area 1220 of the display panel 310 at 120 Hz.

According to an embodiment, the electronic device 101 may drive the first area 1210 at the first partial refresh rate DR1 of 60 Hz and drive the second area 1220 at the second partial refresh rate DR2 of 120 Hz, but configure a length of a scan signal SCAN applied to each of the first area 1210 and the second area 1220 to about 8.3 ms. For example, in the case that a turn-on period (e.g., SOT) of the scan signal SCAN according to the second partial refresh rate DR2 is shorter than a turn-on period (e.g., SOT) of the scan signal SCAN according to the first partial refresh rate DR1, the electronic device 101 may configure the turn-on period (e.g., SOT) of the scan signal SCAN applied to each of the first area 1210 and the second area 1220 to the turn-on period (e.g., SOT) of the scan signal SCAN according to the second partial refresh rate DR2.

According to an embodiment, in the case of equally controlling the turn-on period (e.g., SOT) of the scan signal SCAN applied to the gate lines GL of the first area 1210 and the turn-on period (e.g., SOT) of the scan signal SCAN applied to the gate lines GL of the second area 1220, the electronic device 101 may generate a data signal (e.g., an analog data voltage) applied to each of the first area 1210 and the second area 1220 using one piece of gamma data. For example, the electronic device 101 may generate data signals (e.g., analog data voltages) applied to each of the first area 1210 and the second area 1220 using any one of the first luminance curve 1810 and the second luminance curve 1820 to which gray levels (or luminance) according to data voltages are mapped.

In another embodiment, the electronic device 101 may differently control a turn-on period (e.g., SOT) of the scan signal SCAN applied to gate lines GL of the first area 1210 and a turn-on period (e.g., SOT) of the scan signal SCAN applied to gate lines GL of the second area 1220. In this case, the electronic device 101 may generate data signals (e.g., analog data voltages) applied to each of the first area 1210 and the second area 1220 using different gamma data. For example, the electronic device 101 may generate a data signal (e.g., analog data voltage) applied to the first area 1210 and a data signal (e.g., analog data voltage) applied to the second area 1220 using the second luminance curve 1820 using a first luminance curve 1810 to which gray levels (or luminance) according to data voltages are mapped.

Figure 19:
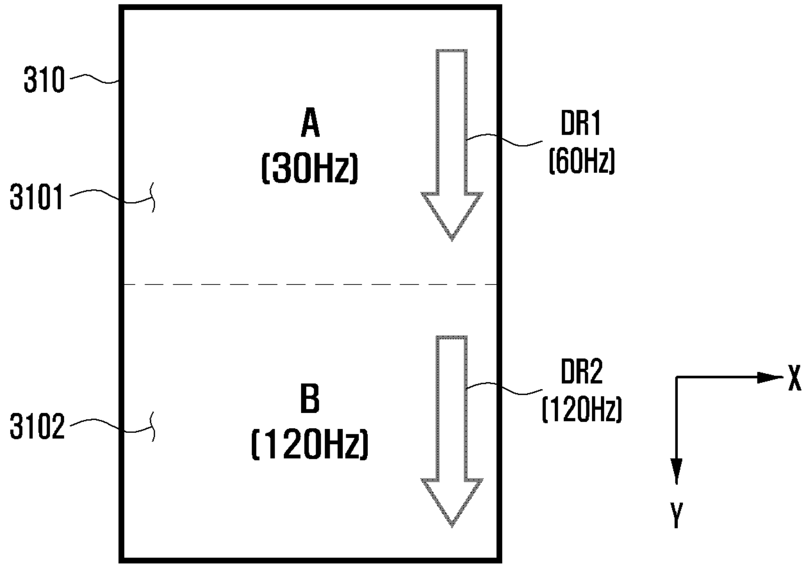
FIG. 19 is a diagram illustrating an operation of controlling a driving frequency of a display panel based on a configuration of a minimum driving frequency by an electronic device according to an embodiment of the disclosure.

FIG. 19 is a diagram illustrating an operation of controlling a driving frequency of a display panel based on a configuration of a minimum driving frequency by an electronic device according to an embodiment of the disclosure.

Referring to FIG. 19, the electronic device 101 according to an embodiment may configure a reference frequency (Ref. Hz) as a minimum driving frequency in a split screen state. For example, in the case that a driving frequency is excessively lowered, an image quality may be deteriorated; thus, the electronic device 101 may determine a driving frequency of each partial area based on the reference frequency (Ref. Hz). For example, a first driving frequency configured by a first application may be 30 Hz, and a second driving frequency configured by a second application may be 120 Hz. According to an embodiment, the electronic device 101 may compare the first driving frequency and the second driving frequency with the reference frequency (Ref. Hz).

According to an embodiment, in the case that the first driving frequency or the second driving frequency is smaller than the reference frequency (Ref. Hz), the electronic device 101 may control an execution screen of a corresponding application to a value greater than or equal to the reference frequency (Ref. Hz). According to the illustrated example, the reference frequency (Ref. Hz) may be 60 Hz, and the electronic device 101 may drive the execution screen of the first application based on 60 Hz, which is the reference frequency (Ref. Hz), not the first driving frequency.

According to an embodiment, in the case that a driving frequency configured by a specific application is smaller than the reference frequency (Ref. Hz), the electronic device 101 may configure an execution screen of the corresponding application to a driving frequency twice or three times the driving frequency. For example, in the case that a driving frequency configured by a specific application is 30 Hz, the electronic device 101 may drive the execution screen of the corresponding application at 60 Hz or 90 Hz.

Figure 20:
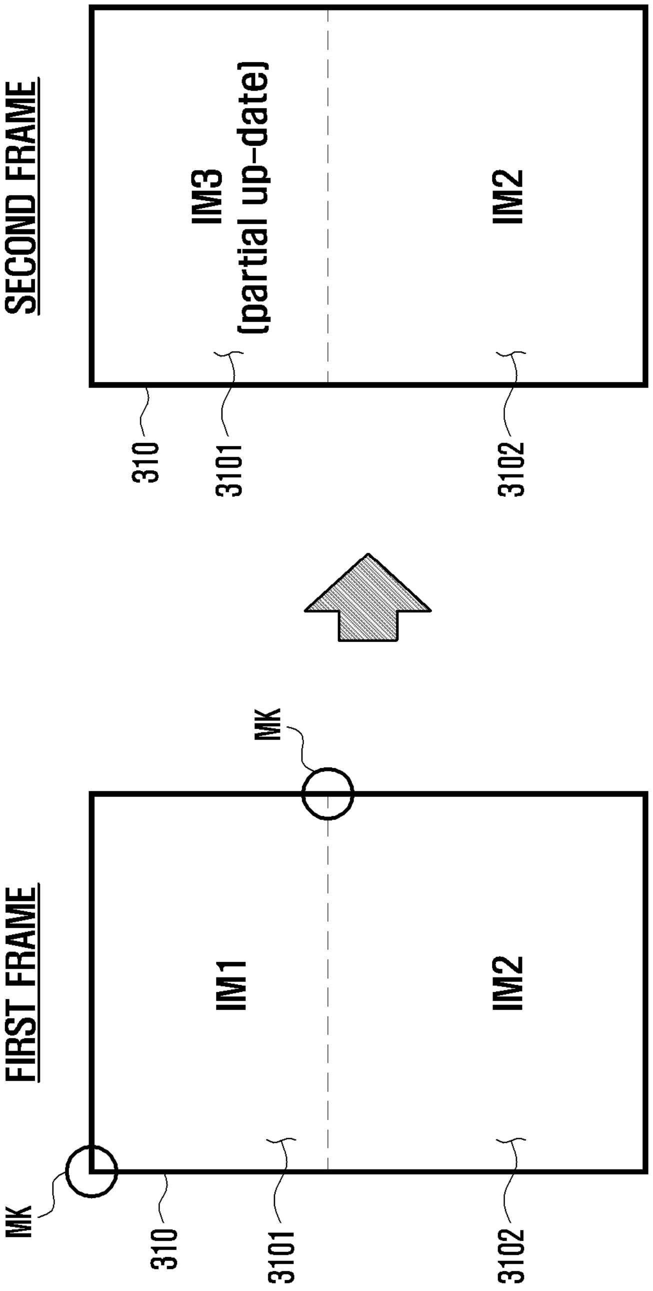
FIG. 20 is a diagram illustrating an operation of updating a partial area by an electronic device according to an embodiment of the disclosure.

FIG. 20 is a diagram illustrating an operation of updating a partial area by an electronic device according to an embodiment of the disclosure.

Referring to FIG. 20, the electronic device 101 according to various embodiments may refer to the memory 350 in order to independently control frequencies driving a plurality of parts of a display panel 310 for displaying different execution screens in a split screen state.

According to an embodiment, the electronic device 101 may refresh (or update) an execution screen of a first application displayed through the first part 3101 in a first frame with a first image IM1 and refresh (or update) an execution screen of a second application displayed through the second part 3102 with a second image IM2.

According to an embodiment, the electronic device 101 may refresh (or update) an execution screen of the first application displayed through the first part 3101 in a second frame with a third image IM3 and self-refresh an execution screen of the second application displayed through the second part 3102 with the second image IM2. According to an embodiment, the DDIC 230 of the electronic device 101 may perform the following operations in order to update only an image corresponding to the first part 3101.

According to an embodiment, in the case that an address corresponding to the first part 3101 cannot be designated in the memory 350 (e.g., graphic random access memory (GRAM)), the electronic device 101 may determine a designated area corresponding to the first part 3101, and the processor 120 may transmit a data signal for a partial area to the DDIC 230 based on information on the designated area.

In another embodiment, in the case that an address corresponding to the first part 3101 cannot be designated in the memory 350 (e.g., GRAM), the electronic device 101 may generate a marker signal MK representing a designated area corresponding to the first part 3101, and the processor 120 may transmit a data signal for the partial area to the DDIC 230 based on the marker signal MK.

In another embodiment, in the electronic device 101, the processor 120 may transmit a data signal for the partial area to the DDIC 230 using the memory 350 (e.g., DRAM) capable of designating an address corresponding to the first part 3101.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:

a display panel;

a display driver integrated circuit (DDIC) configured to drive the display panel; and a processor, wherein the processor is configured to:

control the DDIC to drive the display panel in a split screen state based on a user input, wherein the split screen state comprises a state in which an entire display area of the display panel is divided into a plurality of areas and in which the plurality of areas are driven independently each other, execute a first application, execute a second application, execute a third application, determine a first driving frequency configured by the first application and a position of a first part on which a first execution screen of the first application is to be displayed, determine a second driving frequency configured by the second application and a position of a second part on which a second execution screen of the second application is to be displayed, determine a third driving frequency configured by the third application and a position of a third part on which a third execution screen of the third application is to be displayed, determine whether the first part and the second part are disposed adjacent to each other in a direction perpendicular to a scan direction of the display panel, calculate a least common multiple of the first driving frequency and the second driving frequency in response to the first part and the second part being disposed adjacent to each other in a direction perpendicular to a scan direction of the display panel, control the DDIC to drive a first area of the display panel including the first part and the second part of the display panel based on a first partial refresh rate corresponding to the least common multiple, and control the DDIC to drive a second area of the display panel including the third part of the display panel based on a second partial refresh rate corresponding to the third driving frequency.

2. The electronic device of claim 1, wherein the processor is further configured to:

determine whether at least one area of the first part to the third part is continuously connected without being segmented along the scan direction and has substantially the same width as a horizontal width or a vertical width of the entire display area of the display panel, calculate a least common multiple of the first driving frequency to the third driving frequency based on the determination, and control the DDIC to drive the first area and the second area based on a full screen refresh rate based on the calculated least common multiple of the first driving frequency to the third driving frequency.

3. The electronic device of claim 1, wherein the display panel comprises a plurality of gate lines disposed at intervals along the scan direction and a plurality of data lines disposed to cross the gate lines, and wherein the processor is further configured to:

calculate a turn-on period of a first scan signal corresponding to the first partial refresh rate and a turn-on period of a second scan signal corresponding to the second partial refresh rate, and control the DDIC to supply a plurality of scan signals having a turn-on period of the second scan signal to the plurality of gate lines disposed in the first area and the second area, respectively, in response to the turn-on period of the second scan signal being shorter than that of the first scan signal.

4. The electronic device of claim 3, wherein the processor is further configured to control the DDIC to supply first data of the first application or second data of the second application to the plurality of data lines in synchronization with a plurality of scan signals having a turn-on period of the second scan signal.

5. The electronic device of claim 1, wherein the processor is further configured to display a black line having a specified width at a boundary between the first area and the second area.

6. The electronic device of claim 1, wherein the processor is further configured to control the DDIC to insert a specified delay time between a time for driving the first area and a time for driving the second area.

7. The electronic device of claim 1, wherein the processor is further configured to:

receive a designated event for rotating a screen while the DDIC drives the first area of the display panel based on the first partial refresh rate and drives the second area based on the second partial refresh rate, change a layout in which the first part to the third part are displayed on an entire display screen based on the event, determine whether at least one area of the first part to the third part is continuously connected without being segmented along the scan direction and has substantially the same width as a horizontal width or a vertical width of the entire display area of the display panel, calculate a least common multiple of the first driving frequency to the third driving frequency based on the determination, and control the DDIC to drive the first area and the second area based on a full screen refresh rate based on the calculated least common multiple of the first driving frequency to the third driving frequency.

8. The electronic device of claim 1, wherein the processor is further configured to determine data signals supplied to each of the first area and the second area using one piece of gamma data.

9. The electronic device of claim 1, wherein, in response to the first partial refresh rate being smaller than a reference frequency, the processor is further configured to change the first partial refresh rate to a value greater than or equal to the reference frequency.

10. The electronic device of claim 9, wherein, in response to the first partial refresh rate being smaller than a reference frequency, the processor is configured to control the DDIC to drive the first part at a refresh rate corresponding to a multiple of the first partial refresh rate.

11. A method of driving an electronic device, the method comprising:

executing a first application;

executing a second application;

executing a third application;

determining a first driving frequency configured by the first application and a position of a first part on which a first execution screen of the first application is to be displayed;

determining a second driving frequency configured by the second application and a position of a second part on which a second execution screen of the second application is to be displayed;

determining a third driving frequency configured by the third application and a position of a third part on which a third execution screen of the third application is to be displayed;

determining whether the first part and the second part are disposed adjacent to each other in a direction perpendicular to a scan direction of a display panel of the electronic device;

calculating, in response to the first part and the second part being disposed adjacent to each other in a direction perpendicular to the scan direction of the display panel, a least common multiple of the first driving frequency and the second driving frequency;

controlling a display driver integrated circuit (DDIC) to drive a first area of the display panel including the first part and the second part of the display panel based on a first partial refresh rate corresponding to the least common multiple; and controlling the DDIC to drive a second area of the display panel including the third part of the display panel based on a second partial refresh rate corresponding to the third driving frequency.

12. The method of claim 11, further comprising:

determining whether at least one area of the first part to the third part is continuously connected without being segmented along the scan direction and has substantially the same width as a horizontal width or a vertical width of an entire display area of the display panel;

calculating a least common multiple of the first driving frequency to the third driving frequency based on the determination; and controlling the DDIC to drive the first area and the second area based on a full screen refresh rate based on the calculated least common multiple of the first driving frequency to the third driving frequency.

13. The method of claim 11, wherein the display panel comprises a plurality of gate lines disposed at intervals along the scan direction and a plurality of data lines disposed to cross the gate lines, and wherein the method further comprises:

calculating a turn-on period of a first scan signal corresponding to the first partial refresh rate and a turn-on period of a second scan signal corresponding to the second partial refresh rate; and controlling, in response to the turn-on period of the second scan signal being shorter than that of the first scan signal, the DDIC to supply a plurality of scan signals having the turn-on period of the second scan signal to the plurality of gate lines disposed in the first area and the second area, respectively.

14. The method of claim 13, further comprising:

controlling the DDIC to supply first data of the first application or second data of the second application to the plurality of data lines in synchronization with a plurality of scan signals having the turn-on period of the second scan signal.

15. The method of claim 11, further comprising:

displaying a black line having a specified width at a boundary between the first area and the second area.

16. The method of claim 11, further comprising: controlling the DDIC to insert a specified delay time between a driving time of the first area and a driving time of the second area.

17. The method of claim 11, further comprising:

driving, by the DDIC, the first area of the display panel based on the first partial refresh rate, and receiving a designated event for rotating a screen while driving the second area based on the second partial refresh rate;

changing a layout in which the first part to the third part are displayed on an entire display screen based on the event;

determining whether at least one area of the first part to the third part is continuously connected without being segmented along the scan direction and has substantially the same width as a horizontal width or a vertical width of an entire display area of the display panel;

calculating a least common multiple of the first driving frequency to the third driving frequency based on the determination; and controlling the DDIC to drive the first area and the second area based on a full screen refresh rate based on the calculated least common multiple of the first driving frequency to the third driving frequency.

18. The method of claim 11, further comprising: determining data signals supplied to each of the first area and the second area using one piece of gamma data.

* * * * *